US010455502B2

(12) United States Patent
Abraham et al.

(10) Patent No.: US 10,455,502 B2
(45) Date of Patent: Oct. 22, 2019

(54) OPERATION OF USER EQUIPMENT IN C-DRX MODE WITH TOKEN BUCKET BASED ACCESS

(71) Applicant: QUALCOMM Incorporated, San Diego, CA (US)

(72) Inventors: Santosh Abraham, San Diego, CA (US); Naga Bhushan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 15/414,451

(22) Filed: Jan. 24, 2017

(65) Prior Publication Data

US 2018/0041956 A1 Feb. 8, 2018

Related U.S. Application Data

(60) Provisional application No. 62/370,178, filed on Aug. 2, 2016.

(51) Int. Cl.
*H04W 76/28* (2018.01)
*H04W 74/08* (2009.01)
(Continued)

(52) U.S. Cl.
CPC ....... *H04W 52/0212* (2013.01); *H04L 47/215* (2013.01); *H04W 74/08* (2013.01); *H04W 76/15* (2018.02); *H04W 76/28* (2018.02); *H04W 88/06* (2013.01); *H04W 88/08* (2013.01); *Y02D 70/00* (2018.01); *Y02D 70/10* (2018.01); *Y02D 70/12* (2018.01); *Y02D 70/14* (2018.01); *Y02D 70/142* (2018.01); *Y02D 70/164* (2018.01);
(Continued)

(58) Field of Classification Search
CPC ........................... H04W 52/0212; H04W 4/00
USPC .................................................. 370/230-339
See application file for complete search history.

(56) References Cited

U.S. PATENT DOCUMENTS 9,763,192 B1 * 9/2017 Vivanco ............ H04W 52/0251
2010/0208665 A1    8/2010 Vivanco et al.
(Continued)

OTHER PUBLICATIONS

"3rd Generation Partnership Project; Technical Specification Group Services and System Aspects; Quality of Service (QoS) Concept and Architecture (Release 13)", 3GPP Standard; 3GPP TS 23.107, 3rd Generation Partnership Project (3GPP), Mobile Competence Centre, 650, Route Des Lucioles, F-06921, Sophia-Antipolis Cedex, France, vol. SA WG2, No. V13.0.0, Dec. 15, 2015, pp. 1-42, XP051294434, [retrieved on Dec. 15, 2015].
(Continued)

*Primary Examiner* — Iqbal Zaidi
(74) *Attorney, Agent, or Firm* — Loza & Loza, LLP

(57) ABSTRACT

Systems, methods, and apparatus for transmitting additional information over a radio access network are described. A method of wireless communication includes aligning a discontinuous reception (DRx) schedule for a user equipment (UE) with a plurality of token arrival times, determining, at a time based on a first token arrival time, whether a radio frequency (RF) band is available for communication, and transmitting control information on the RF band when the RF band is available for communication. The token arrival time may correspond to a waking time for the UE defined by the DRx schedule.

29 Claims, 15 Drawing Sheets

(51) Int. Cl.
    *H04L 12/819*     (2013.01)
    *H04W 76/15*     (2018.01)
    *H04W 52/02*     (2009.01)
    *H04W 88/06*     (2009.01)
    *H04W 88/08*     (2009.01)

(52) U.S. Cl.
    CPC .............. *Y02D 70/20* (2018.01); *Y02D 70/21* (2018.01); *Y02D 70/22* (2018.01); *Y02D 70/24* (2018.01); *Y02D 70/26* (2018.01)

(56) References Cited

U.S. PATENT DOCUMENTS

2011/0075558 A1*   3/2011   Isaksson ............... H04L 47/215
    370/230.1
2011/0128921 A1*   6/2011   Ray ....................... H04L 5/0037
    370/329
2011/0317556 A1   12/2011   Hiehata et al.

OTHER PUBLICATIONS

International Search Report and Written Opinion—PCT/US2017/044529—ISA/EPO—dated Nov. 24, 2017.

\* cited by examiner

OPERATION OF USER EQUIPMENT IN C-DRX MODE WITH TOKEN BUCKET BASED ACCESS

PRIORITY CLAIM

This application claims priority to and the benefit of U.S. Provisional Patent Application Ser. No. 62/370,178 filed in the U.S. Patent Office on Aug. 2, 2016, the entire content of which being incorporated herein by reference as if fully set forth below in its entirety and for all applicable purposes.

TECHNICAL FIELD

The technology discussed below relates generally to wireless communication systems, and more particularly, to coexistence techniques for devices sharing a communication resource.

BACKGROUND

Wireless communication networks are widely deployed to provide various communication services such as telephony, video, data, messaging, broadcasts, and so on. Such networks, which are usually multiple access networks, support communication for multiple users by sharing the available network resources. Next generation (5G) networks may operate using certain radio frequency (RF) bands that are used for other types of wireless communication. For example, some 5G networks may use the industrial, scientific, and medical (ISM) radio band or the Unlicensed National Information Infrastructure (U-NII) radio band, which are used for conventional Wi-Fi communications.

As the demand for mobile broadband access continues to increase, research and development continue to advance wireless communication technologies not only to meet the growing demand for mobile broadband access, but to advance and enhance the user experience with mobile communications.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Certain aspects of the disclosure relate to systems, apparatus, methods and techniques that improve coexistence of devices that operate using different radio access technologies. Some of these aspects relate to aligning schedules that define wake up times for devices that can placed in low-power or sleep states.

In various aspects of the disclosure, a method of wireless communication at user equipment includes determining, while operating in a low-power state, whether a token bucket contains a token at a waking time defined by a discontinuous reception schedule that is established through communication with a scheduling entity, exiting the low-power state when the token bucket contains a first token at the waking time, and receiving control information transmitted by the scheduling entity over a radio frequency band at or near a token arrival time corresponding to the first token.

In one aspect, the control information is received from a first access block transmitted on the radio frequency band.

In one aspect, the method includes determining whether the token bucket contains a second token after completion of the communication of the first access block, and receiving a second access block transmitted on the radio frequency band when the token bucket contains the second token.

In one aspect, the method includes determining whether the token bucket contains a fractional token after completion of the communication of the first access block, and receiving control information from a shortened access block transmitted on the radio frequency band when the token bucket contains the fractional token.

In one aspect, the method includes receiving the control information in a short control frame transmitted on the radio frequency band. The short control frame may include a physical downlink control channel.

In one aspect, exiting the low-power state includes powering-up a radio frequency transceiver, and using the radio frequency transceiver to receive the control information In one aspect, content of the token bucket and token arrival times are updated through information received from the scheduling entity.

In one aspect, the control information is received using wireless local area network technology.

In one aspect, the discontinuous reception schedule is defined using 5th Generation Mobile Telecommunications technology.

In various aspects, an apparatus for wireless communication includes a transceiver adapted to communicate on an RF band, a memory, and a processor coupled to the memory. The processor may be configured to determine, while the apparatus is operating in a low-power state, whether a token bucket contains a token at a waking time defined by a discontinuous reception schedule that is established through communication with a scheduling entity, exit the low-power state when the token bucket contains a first token at the waking time, and receive control information transmitted by the scheduling entity over a radio frequency band at or near a token arrival time corresponding to the first token.

In one aspect, the control information may be received from a first access block transmitted on the radio frequency band. The processor may be configured to determine whether the token bucket contains a second token after completion of the communication of the first access block, and receive a second access block transmitted on the radio frequency band when the token bucket contains the second token. The processor may be configured to determine whether the token bucket contains a fractional token after completion of the communication of the first access block, and receive control information from a shortened access block transmitted on the radio frequency band when the token bucket contains a fractional token. The processor may be configured to receive the control information in a short control frame transmitted on the radio frequency band. The short control frame may include a physical downlink control channel.

In one aspect, content of the token bucket and token arrival times are updated through information received from the scheduling entity.

In one aspect, the transceiver is adapted to communicate on the RF band using a wireless local area network (WLAN) technology. The DRx schedule may be defined using 5th Generation Mobile Telecommunications technology.

In various aspects, a processor-readable medium may include a computer-readable medium having code stored thereon. The computer-readable medium may be a transitory storage medium or non-transitory storage medium. The code may be executable by a processor. When executed the code may cause the processor to determine whether a token bucket contains a token at a waking time defined by a DRx schedule that is established through communication with a scheduling entity while operating in a low-power state, exit the low-power state when the token bucket contains a first token at the waking time, and receive control information transmitted by the scheduling entity over a radio frequency band at or near a token arrival time corresponding to the first token.

In some aspects, the control information is received from a first access block transmitted on the radio frequency band. The code may cause the processor to determine whether the token bucket contains a second token after completion of the communication of the first access block, and receive a second access block transmitted on the radio frequency band when the token bucket contains the second token. The code may cause the processor to determine whether the token bucket contains a fractional token after completion of the communication of the first access block, and receive control information from a shortened access block transmitted on the radio frequency band when the token bucket contains the fractional token. The code may cause the processor to receive the control information in a short control frame transmitted on the radio frequency band. The short control frame may include a physical downlink control channel.

In one aspect, the processor may exit the low-power state by powering-up a radio frequency transceiver, and use the radio frequency transceiver to receive the control information.

In one aspect, content of the token bucket and token arrival times are updated through information received from the scheduling entity.

In one aspect, the control information is received using wireless local area network technology, and the DRx schedule is defined using 5th Generation Mobile Telecommunications technology.

In various aspects, a method of wireless communication includes determining state of a token bucket at a wake-up time defined by a discontinuous reception schedule for user equipment, and when the token bucket contains a first token: determining whether a radio frequency band is available for communication, and transmitting control information in a first access block on the radio frequency band when the radio frequency band is available for communication. When the token bucket contains no token, the method may include transmitting control information on the radio frequency band in a physical downlink control channel.

In one aspect, the method includes reserving the radio frequency band for communication of the first access block when the token bucket contains the first token. Reserving the radio frequency band may include sending a first reservation signal, and transmitting the first access block after reserving the radio frequency band. The first reservation signal may include a clear-to-send. The first reservation signal may precede the first access block.

In one aspect, the method may include determining whether the token bucket contains a second token after completion of the communication on the radio frequency band during the access block, and sending a second reservation signal if the token bucket contains the second token.

In one aspect, the method may include determining whether the token bucket contains a fractional token after completion of the communication of the access block, communicating on the radio frequency band during a shortened access block after the first access block when the token bucket contains the fractional token, and transmitting the control information in the shortened access block.

In one aspect, the method may include communicating on the radio frequency band includes using wireless local area network technology. In one example, the discontinuous reception schedule may be defined using 5th Generation Mobile Telecommunications technology.

In various aspects, an apparatus for wireless communication includes a transceiver adapted to communicate on an RF band, a processor-readable storage medium and a processor coupled to the processor-readable storage medium. The processor may be configured to cause the apparatus to determine state of a token bucket at a wake up time defined by a discontinuous reception schedule for user equipment, determine whether a radio frequency band is available for communication when the token bucket contains a first token, transmit control information in a first access block on the radio frequency band when the token bucket contains a first token and the radio frequency band is available for communication, and transmit control information on the radio frequency band in a short control frame when the token bucket contains no token.

In one aspect, the short control frame includes a physical downlink control channel.

In some aspects, the processor is configured to send a first reservation signal to reserve the radio frequency band for communication of the first access block when the token bucket contains the first token, and transmit the first access block after the radio frequency band is reserved. The first reservation signal includes a clear-to-send. The first reservation signal may precede the first access block. The processor may be configured to determine whether the token bucket contains a second token after completion of the communication on the radio frequency band during the access block, and send a second reservation signal if the token bucket contains a token. The processor may be configured to determine whether the token bucket contains a fractional token after completion of the communication of the access block, communicate in a shortened access block the radio frequency band after the first access block when the token bucket contains the fractional token, and transmit the control information in the shortened access block.

In one aspect, the processor may be configured to communicate on the RF band using wireless local area network technology, and define the DRx schedule using 5th Generation Mobile Telecommunications technology.

In various aspects, a processor-readable medium may include a computer-readable medium having code stored thereon. The computer-readable medium may be a transitory storage medium or non-transitory storage medium. The code may be executable by a processor. When executed the code may cause the processor to determine state of a token bucket at a wake up time defined by a DRx schedule for user equipment. When the token bucket contains a first token, the processor may be configured to determine whether a radio frequency band is available for communication, and transmit control information in a first access block on the radio frequency band when the radio frequency band is available for communication. When the token bucket contains no token, the processor may be configured to transmit control information on the radio frequency band in a physical downlink control channel.

In certain aspects, the code may cause the processor to reserve the radio frequency band for communication of the first access block when the token bucket contains the first token, wherein reserving the radio frequency band comprises sending a first reservation signal, and transmit the first access block after reserving the radio frequency band. The first reservation signal may include a clear-to-send. The first reservation signal may precede the first access block. The code may cause the processor to determine whether the token bucket contains a second token after completion of the communication on the radio frequency band during the access block, and send a second reservation signal if the token bucket contains the second token. The code may cause the processor to determine whether the token bucket contains a fractional token after completion of the communication of the access block, communicate on the radio frequency band during a shortened access block after the first access block when the token bucket contains the fractional token, and transmit the control information in the shortened access block.

In one aspect, communicating on the radio frequency band includes using wireless local area network technology. The DRx schedule may be defined using 5th Generation Mobile Telecommunications technology.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Overview

According to certain aspects disclosed herein, a base station and user equipment may communicate over a wireless network, where the user equipment may enter low-power modes in accordance with a discontinuous reception schedule defined by a fifth-generation network technology. The base station and user equipment may communicate over an unlicensed wireless network that implements a wireless local area network, where access to the wireless local area network is controlled using token-bucket procedures. The discontinuous reception schedule and token-bucket procedures are coordinated and/or aligned such that control information and communication opportunities coincide with waking events for user equipment.

In one example, user equipment may determine whether a token bucket contains a token at a waking time defined by a discontinuous reception schedule while the UE is operating in a low-power state. The discontinuous reception schedule may be established through communication with a scheduling entity. The UE may exit the low-power state when the token bucket contains a token at the waking time. The UE may receive control information transmitted by the scheduling entity over a radio frequency band at or near a token arrival time corresponding to the token.

Example of a Radio Access Network

Figure 1:
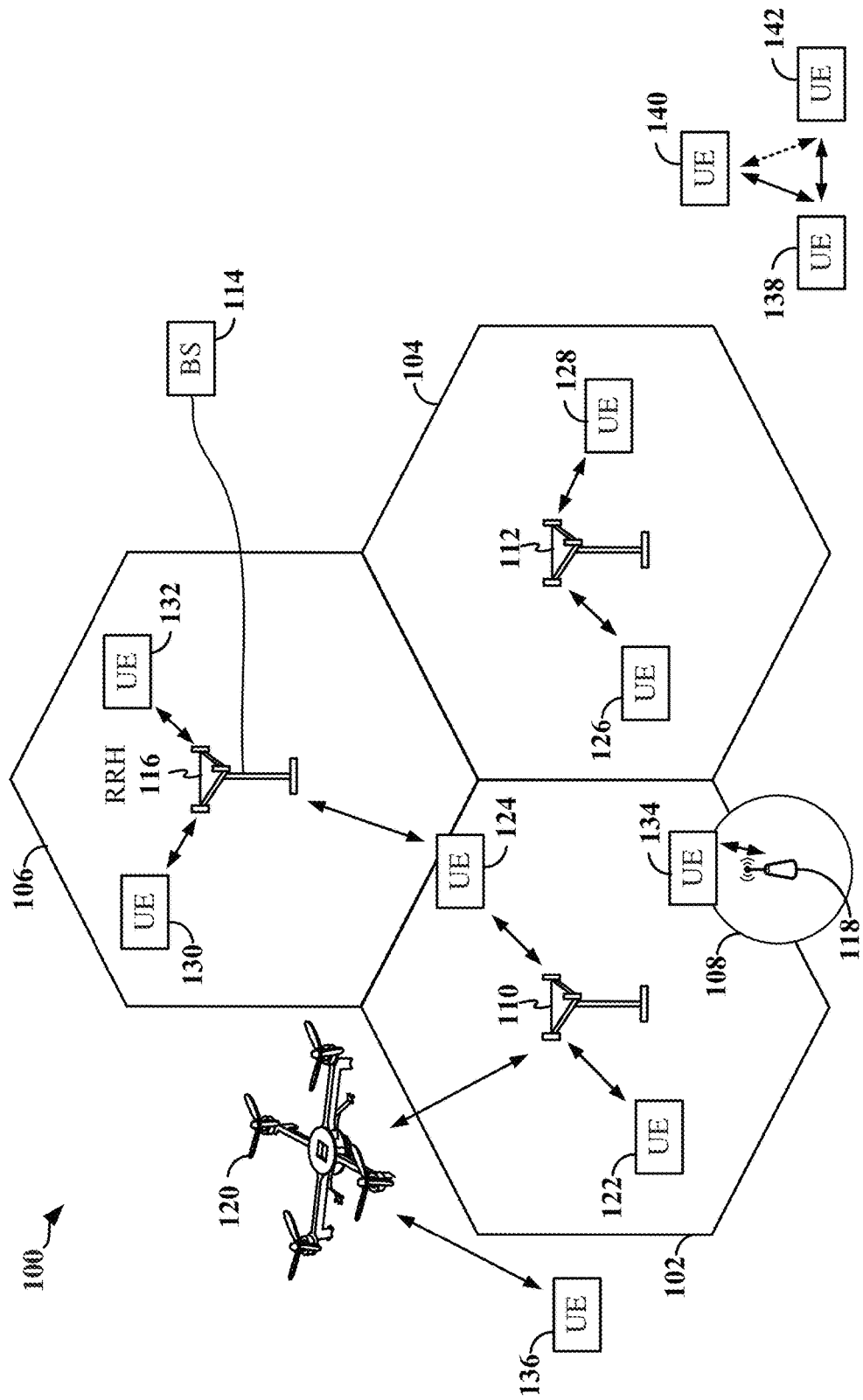
FIG. 1 is a conceptual diagram illustrating an example of a radio access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The radio access network 100 may be a next generation (e.g., fifth generation (5G)) access network or a legacy (3G or 4G) access network. In addition, one or more nodes in the radio access network 100 may be next generation nodes or legacy nodes.

The geographic region covered by the radio access network 100 may be divided into a number of cellular regions (cells). FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

In FIG. 1, two high-power base stations 110 and 112 are shown in cells 102 and 104; and a third high-power base station 114 is shown controlling a remote radio head (RRH) 116 in cell 106. That is, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks. In some instances, a radio access network 100 and equipment that connects mobile apparatus to the public telephone network or the Internet may be referred to as a Universal Terrestrial Radio Access Network (UTRAN).

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, the quadcopter 120 may be configured to function as a UE. For example, the quadcopter 120 may operate within cell 102 by communicating with base station 110.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Further, the air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of its location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the radio access network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Signaling Entities

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities.

That is, for scheduled communication, UEs or scheduled entities utilize resources allocated by the scheduling entity. Base stations are not the only entities that may function as a scheduling entity. That is, in some examples, a UE may function as a scheduling entity, scheduling resources for one or more scheduled entities (e.g., one or more other UEs). In other examples, side link signals may be used between UEs without necessarily relying on scheduling or control information from a base station. For example, UE 138 is illustrated communicating with UEs 140 and 142. In some examples, the UE 138 is functioning as a scheduling entity or a primary side link device, and UEs 140 and 142 may function as a scheduled entity or a non-primary (e.g., secondary) side link device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling UE 138.

Figure 2:
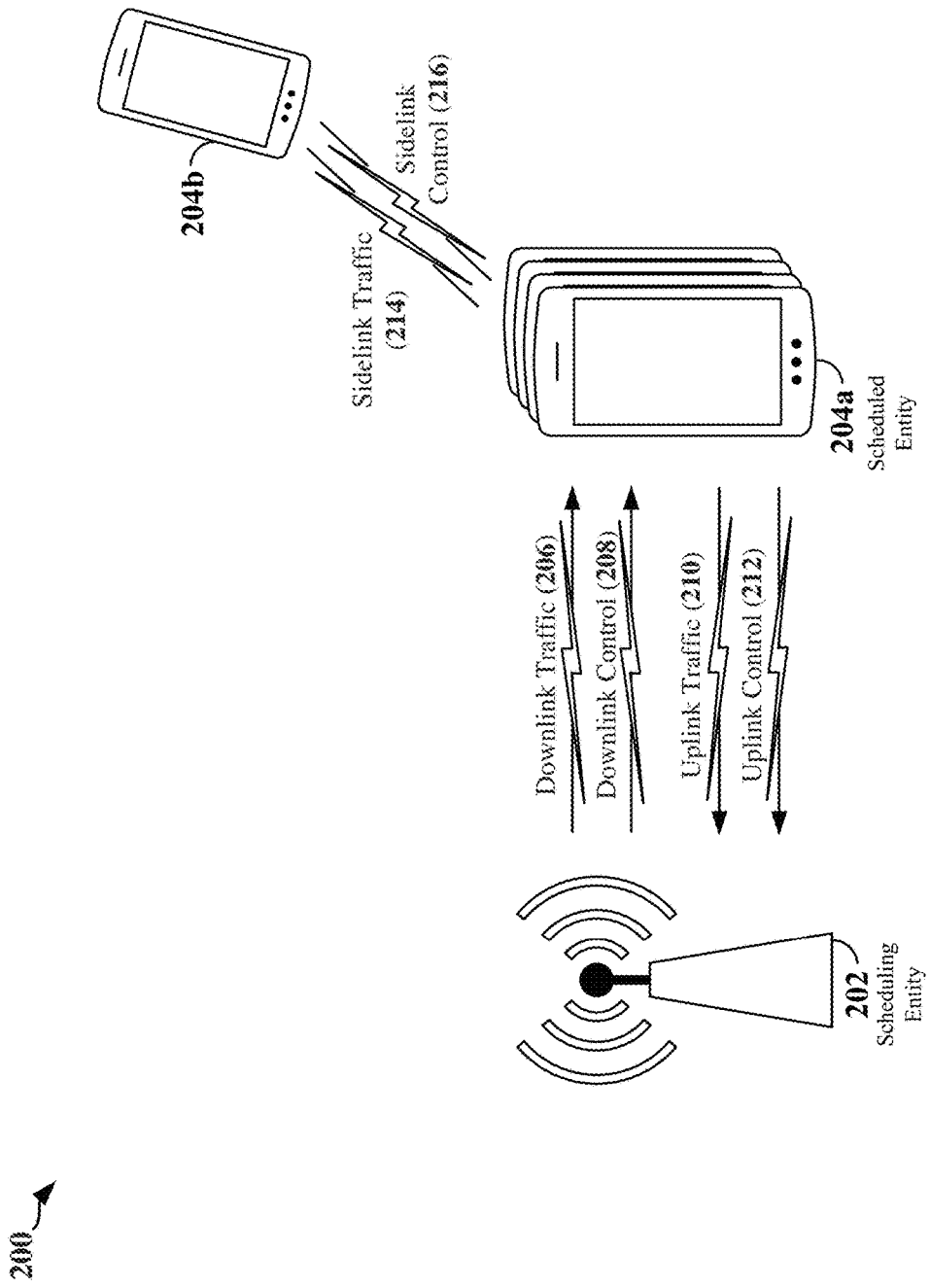
FIG. 2 is a block diagram conceptually illustrating an example of a scheduling entity communicating with one or more scheduled entities according to some embodiments.

Thus, in a wireless communication network with scheduled access to time—frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and traffic information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel, the scheduling entity 202 may transmit downlink control information 208 that may schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize side link signals for direct D2D communication. Side link signals may include side link traffic information 214 and side link control information 216. Side link control information 216 may include a request-to-send (RTS) channel and a clear-to-send (CTS) channel. The RTS may provide for a scheduled entity 204 to request a duration of time to keep a side link channel available for a side link signal; and the CTS may provide for the scheduled entity 204 to indicate the availability of the side link channel, e.g., for a requested duration of time. An exchange of RTS and CTS signals (e.g., handshake) may enable different scheduled entities performing side link communications to negotiate the availability of the side link channel prior to communication of the side link traffic information 214.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

5G Access Technology with Wi-Fi Co-Existence

Figure 3:
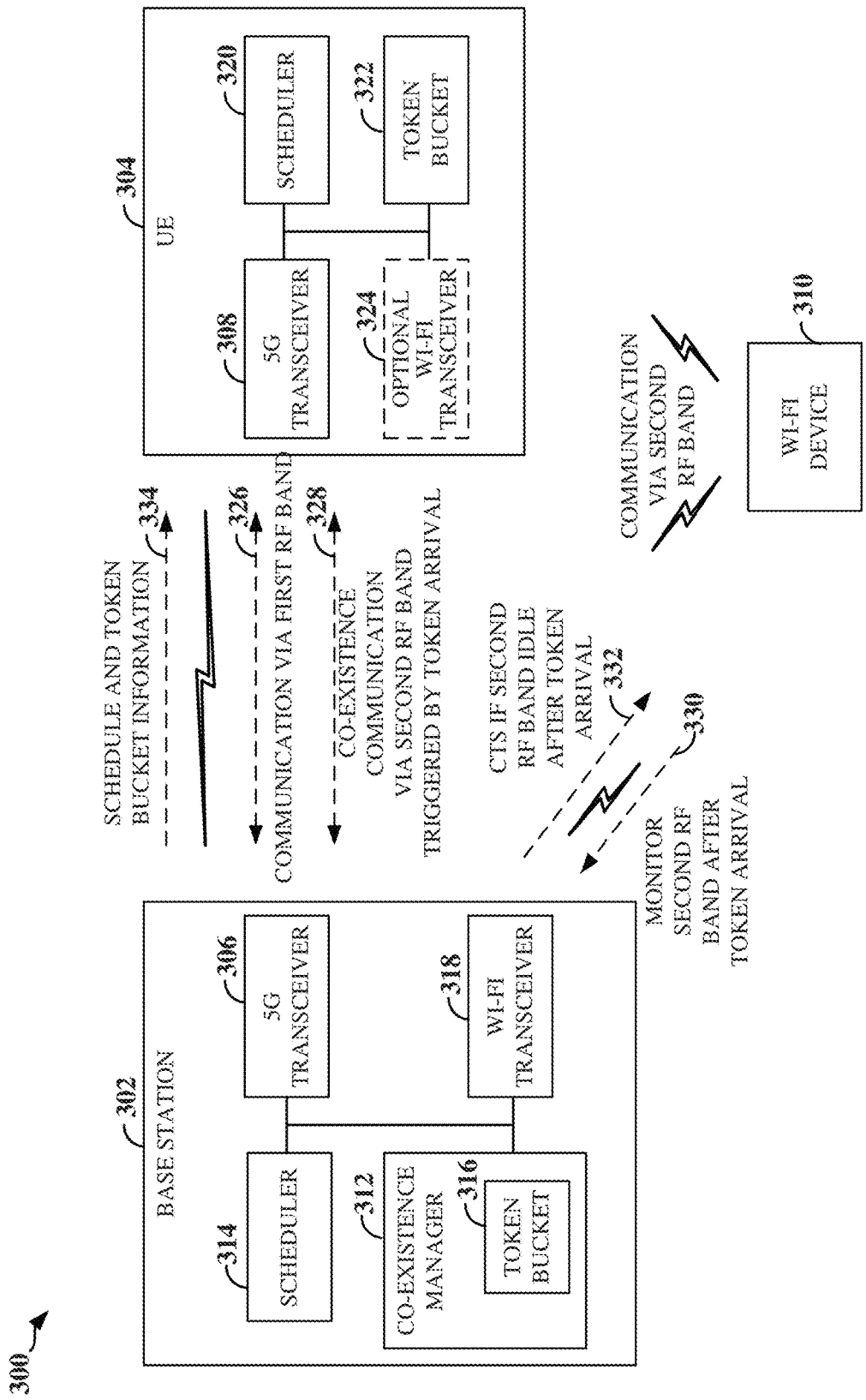
FIG. 3 is a block diagram illustrating an example of a scheduling and token bucket scheme in accordance with some aspects of the disclosure.

FIG. 3 illustrates an example of a communication system 300 that supports communication co-existence in accordance with certain aspects disclosed herein. The communication system 300 includes a base station 302 that communicates 326 with a user equipment (UE) 304 via a first radio frequency (RF) band. The communication system 300 may include other wireless communication devices (e.g., other base stations and UEs). To reduce the complexity of FIG. 3, only one base station 302 and one UE 304 are illustrated.

The base station 302 includes a 5G transceiver 306 and the UE 304 includes a 5G transceiver 308 for the communication 326 via the first RF band (and optionally other RF bands). Each transceiver may include physical (PHY) layer functionality and media access control (MAC) layer functionality. In accordance with the teachings herein, the base station 302 and the UE 304 may also communicate 328 via a second RF band that is being used by a Wi-Fi device 310. In one example, the Wi-Fi device 310 may communicate using wireless local area network (WLAN) technology. In the illustrated example, the base station 302 includes a co-existence manager 312, a scheduler 314, and a token bucket 316 that collectively avoid collisions and ensure access fairness on the second RF band.

In some instances, the second RF band does not overlap with the first RF band. In some instances, the second RF band partially overlaps with the first RF band. In some instances, the second RF band is entirely within the first RF band. In some instances, the first RF band is entirely within the second RF band.

The base station 302 may use the token bucket 316 to ensure access fairness. In one example, a token arrival rate at the token bucket 316 may be used to limit access of the base station 302 to the second RF band. When a token arrives and/or is added to the token bucket 316, the co-existence manager 312 may monitor 330 the second RF band to determine whether the second RF band is idle. In one example, the second RF band may be monitored through a Wi-Fi transceiver 318. If the second RF band is idle, the co-existence manager 312 may cause the Wi-Fi transceiver 318 to send a clear-to-send (CTS 332) or some other suitable type of signal over the second RF band to reserve the second RF band for 5G communication. The base station 302 may use the second RF band (e.g., during a scheduled access block), and a token may be deleted from the token bucket 316. When the base station 302 does not use the second RF band during the access block (e.g., the second RF band is not idle), the number of tokens in the token bucket 316 is not decreased. Tokens may be accumulated at the base station 302, up to a maximum token limit.

The scheduler 314 may define a schedule to be used by the base station 302 and the UE 304 for 5G communication on the second RF band. In one example, relatively short frames may be scheduled to ensure that Wi-Fi devices 310 have adequate access to the second RF band.

The base station 302 may provide its schedule and token bucket information 334 to the UE 304. For example, the base station 302 may provide the schedule and token bucket information 334 via a control channel such as a physical downlink control channel (PDCCH) or via some other suitable signaling technique. The schedule and token bucket information 334 may include, for example, an indication of the specific time slots that are scheduled for 5G communication on the second RF band as well as token bucket parameters (e.g., token arrival rate, maximum number of tokens, etc.).

The UE 304 may include a scheduler 320 that maintains a local instance of a schedule for 5G communication on the second RF band. The UE 304 may maintain a local instance of the token bucket 322 that mirrors the token bucket 316 in the base station 302. Local instances of the schedule and token bucket 322 enable the UE 304 to monitor the second RF band at the times the base station 302 is expected to commence 5G communication on the second RF band. For example, at a defined token arrival time (e.g., as defined by the schedule 320 and/or the parameters of the token bucket 322), the UE 304 may switch its 5G communication from the first RF band (or wake from a low power state) to communicate via the second RF band. The UE 304 may confirm that a 5G communication from the base station 302 is beginning during a scheduled access block on the second RF band upon receipt of a downlink signal from the base station 302. If the UE 304 detects a downlink signal, the UE 304 proceeds with the 5G communication and deletes a token from the token bucket 322. If the UE 304 does not detect a downlink signal, the UE 304 does not delete a token from the token bucket 322 and may go back to sleep until the next token arrival time. In some implementations, the UE 304 may include a Wi-Fi transceiver 324 for monitoring the second RF band to determine whether the second RF band is clear (or sufficiently clear for 5G communication) in the vicinity of the UE 304.

Figure 4:
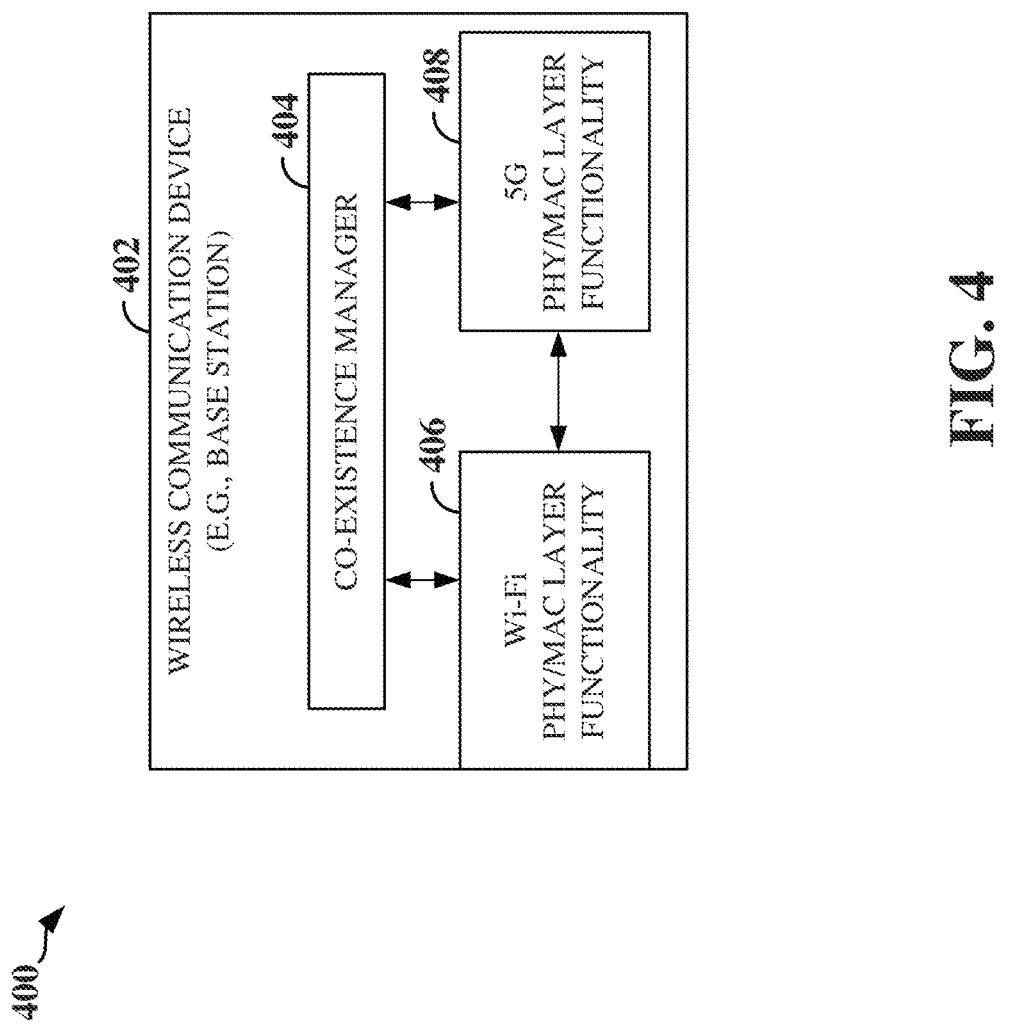
FIG. 4 is a block diagram conceptually illustrating an example of a wireless communication device supporting co-existence in accordance with some aspects of the disclosure.

FIG. 4 illustrates an example of a wireless communication device 402 that includes a co-existence manager 404 configured to manage co-existence on a communication medium that may include one or more RF bands. The wireless communication device 402 also includes Wi-Fi PHY/MAC layer functionality 406 and 5G PHY/MAC layer functionality 408, each of which is capable of transmitting and/or receiving signals according to the corresponding radio access technology. The wireless communication device 402 may correspond to, for example, the base station 302 of FIG. 3.

In the illustrated example, the wireless communication device 402 may be a scheduling device, and one or more UEs may operate as subordinate devices that are scheduled by the wireless communication device 402. A subordinate device may transmit only when scheduled by the wireless communication device 402 and, in some implementations, the subordinate device does not monitor the state of the unlicensed medium to be used for 5G communication.

The co-existence manager 404 may initiate a sub-frame sequence for 5G communication on a medium that is used, or may be used by Wi-Fi devices. In one example, each sub-frame is 0.5 milliseconds (ms). To ensure access fairness on the channel, only a subset of the number of sub-frames that could be used on the channel may be utilized for 5G communication. The number of contiguous sub-frames used for 5G could be limited to ten sub-frames or some other suitable number. This helps to ensure that the medium is not blocked for prolonged periods of time. In one example, the number of sub-frames used may be transmitted in less than 5 ms.

Each base station may be configured with token bucket information including a token fill rate and a maximum number of tokens. For each token in the token bucket, a device may be allowed to access the medium during an access block that occurs at the time of availability of the token, which may be indicated as the token arrival time.

In some instances, each UE served by a base station may be provided with the base station's token bucket parameters. The UEs will know the token arrival time for the base station and can therefore determine the exact time that the base station has a token. A UE may elect to wake up from a low power mode at the time the UE determines that the base station has a token. When a token bucket-based access technique is used by a base station to control communication on the next scheduled access block of sub-frames or slots, the UE or station (STA) may wake up at, or shortly before the scheduled time for a block of sub-frames.

Tokens may accumulate in a token bucket. For example, a base station may accumulate a token for every block of time the base station does not utilize (e.g., due to lack of traffic to send or due to traffic on the channel). The number of tokens accumulated in the token bucket can be controlled to ensure that the number does not exceed a maximum number.

Figure 5:
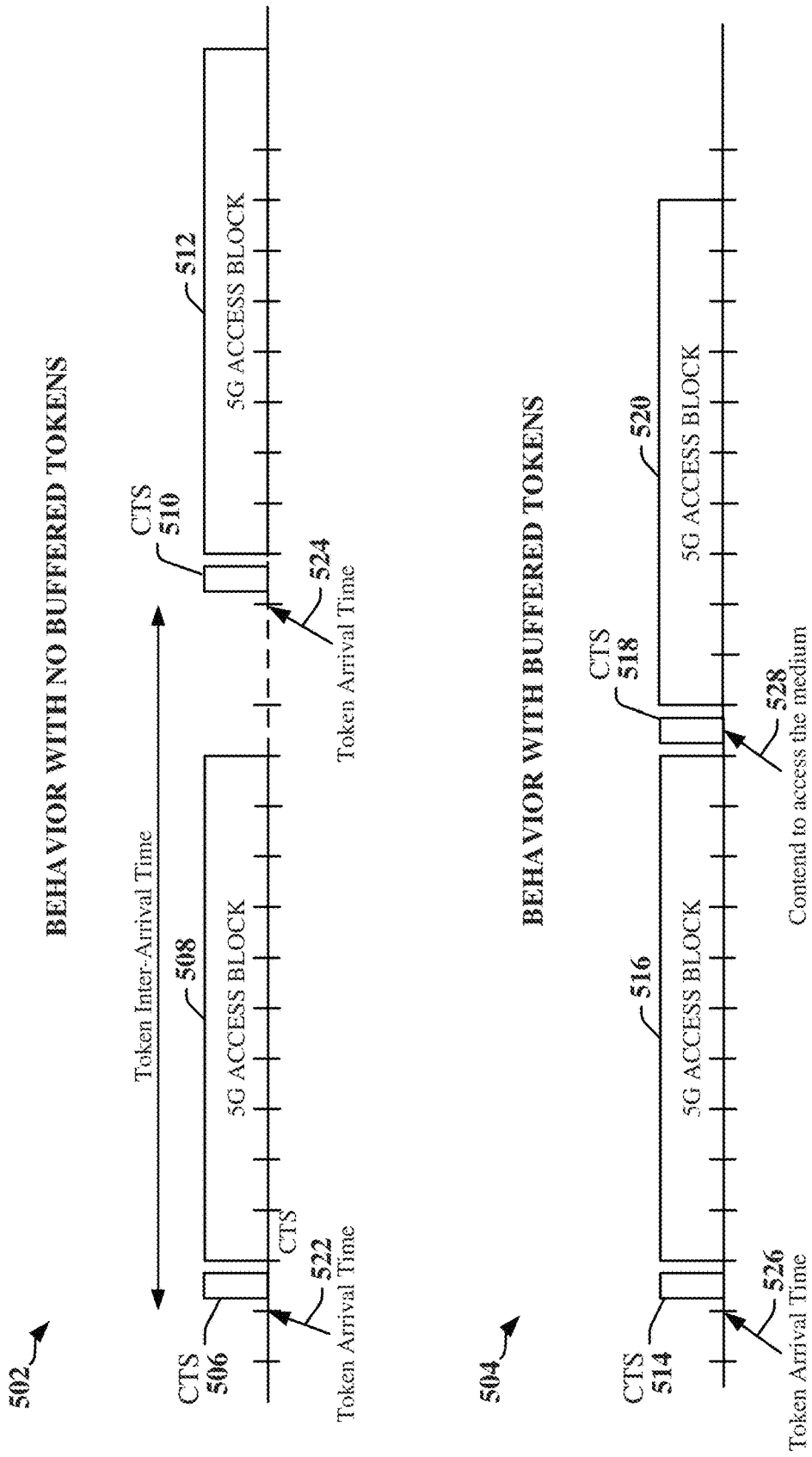
FIG. 5 is a timing diagram illustrating an example of scheduling in accordance with some aspects of the disclosure.

FIG. 5 includes timing diagrams 502 and 504 illustrating certain aspects of token bucket-based access techniques. The first timing diagram 502 corresponds to a scenario where the token bucket is empty upon completion of a first access block. The second timing diagram 504 corresponds to a scenario where the token bucket still contains at least one token upon completion of a first access block.

The first timing diagram 502 relates to an access operation that may be performed by base station when a token is present, following a token arrival time 522 for example. A Wi-Fi MAC of the base station begins a clear channel assessment (CCA) procedure or some other type of medium contention procedure a period of time prior to the first scheduled sub-frame. For example, if the medium is detected as idle for a number of microseconds, the base station may send out a CTS 506 to reserve the medium for a period of time corresponding to an access block 508. In one example, the access block may be used to transmit 10 sub-frames. In some implementations, an address of the CTS 506 may be set to an address reserved for 5G operation. In this way, a device that receives the CTS 506 can determine that the CTS 506 relates to a scheduled 5G communication. Since the token bucket is empty after completion of the access block 508 in this example, the base station may wait until the next token arrival time 524 to send another CTS 510 to reserve the time for another access block 512.

The UEs may track the token bucket used by the base station. Accordingly, a UE can wake up slightly prior to the start of a 5G access block and determine whether the base station has a token. Upon determining that the base station has started the sequence of sub-frames of an access block, the UE participates in each of the sub-frames according to the schedule provided by the base station. In some implementations, the first sub-frame of a 5G access block begins with a downlink transmission, including in some instances where the sub-frame is designated as uplink-centric. A UE may monitor for downlink transmission to determine whether the base station is communicating during the 5G access block.

The second timing diagram 504 relates to the operation of a base station when a token bucket contains multiple tokens, including after a token arrival time 526. If the medium is detected as idle, the base station sends out a CTS 514 to reserve the medium for a period of time corresponding to an access block 516. Since there is still at least one token in the token bucket after completion of the access block 516 in this example, the base station may send another CTS 518 immediately and/or at a time 528 prior to a next token arrival time. The base station may send the CTS 518 to contend for access to the medium, where time is reserved for another access block 520.

Due to CCA conditions, access during the first possible sub-frame might not be possible. In this case, the base station may persist with the contention procedure until the CTS is sent. At the sub-frame that is subsequent to this CTS, the base station initiates communication for the 5G sub-frames (e.g., the remaining portion of the 5G access block).

In one example, one of two options may be available when the CCA procedure at the base station does not permit CTS transmission within the sub-frame prior to the desired start of the 5G access block. In a first option (Option 1), the base station persists with the CCA/contention until the CTS can be sent. Here, UEs may remain awake until communication commences on one of the 5G sub-frames. A new token may arrive during the contention period. In a second option (Option 2), the base station persists with CCA/contention for a known duration, which may be measured as a defined number of sub-frames, for example. The base station may store the token and restart the 5G access operation at the next token arrival time if a CTS still cannot be sent within the known duration. In one example, the known duration may correspond to the transmission time of two sub-frames).

In view of Options 1 and 2, the following operations may be performed in the event a base station has accumulated multiple tokens in the token bucket (e.g., the scenario associated with the timing diagram 504). As soon as a 5G access block is completed, the base station starts contending for the next CTS to send. Also, the UEs will be aware that the base station has more tokens in the token bucket. Consequently, the UEs may persist in the wake state. If the base station cannot access the medium again, the base station persists according to behavior described in Option 1 or Option 2.

In some implementations, CCA is also implemented at a UE. For example, a UE that detects high interference in its neighborhood may elect to not communicate during the next 5G access block.

Figure 6:
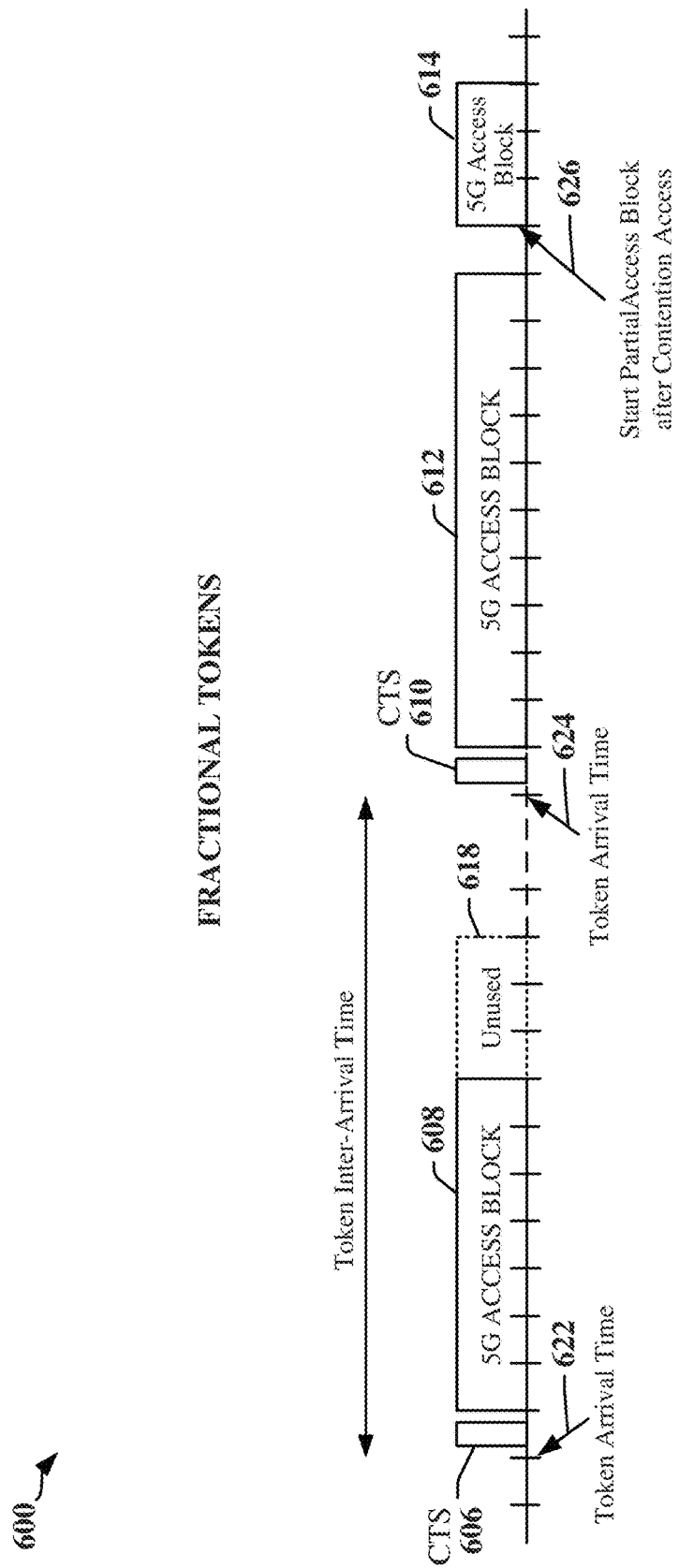
FIG. 6 illustrates the use of fractional tokens in accordance with some aspects of the disclosure.

FIG. 6 is a timing diagram 600 that illustrates certain aspects related to the use of fractional tokens in conjunction with token bucket-based access techniques. Fractional tokens may be created or stored when there is insufficient uplink or downlink traffic to fully utilize a full subframe sequence. A base station may store a fractional token corresponding to the number of unused sub-frames in an access block associated with a token.

In the example illustrated in FIG. 6, the base station may have insufficient data, control information or other traffic to transmit a complete access block, and the base station may transmit a partial access block 608 after a first token arrival time 622. The base station may store a fractional token that identifies the number of subframes that were not transmitted after the first token arrival time 622. The fractional token size may be calculated as:

Number of Unused Frames/Number of Subframes In Subframe Sequence.

In some implementations, an access may be initiated for a normal token, and no access may be initiated when using a fractional token. That is, the token bucket size must be at least 1 to initiate a sub frame sequence. A fractional token has a token size that is less than 1. A UE may initiate an access when the token bucket size is greater than n, where n is an integer number. When the bucket size is less than n+1, the UE may transmit a partial access block 614 after transmitting a complete access block 612. Before transmitting the partial access block 614, the UE may leave the medium unoccupied for a minimum period of time, which may be defined by protocol or regulations. The UE may then access the medium to transmit a number of sub frames as permitted by the fractional token.

Co-Existence in Access Networks that Support C-DRx

In certain radio access networks, UEs may enter a low-power state when no radio communication is scheduled. Wireless communication devices may power down radio transceivers while operating in the low-power state. According to certain aspects disclosed herein, a UE may be adapted to coordinate token bucket co-existence techniques with procedures governing entry to low-power states and exit from low-power states.

Certain radio access technologies provide a radio resource control (RRC) protocol layer that controls various operational states of a wireless communication device. In one example, UEs may be adapted or configured to determine a schedule for communicating with the base station, and the UE may control a mode of operation or operational state based on the schedule. In one example, the schedule may define a paging schedule or a discontinuous reception (DRx) schedule for a current serving cell. The UEs may respond to information provided in a paging channel (PCH) to support efficient power-down or sleep-mode procedures. A PCH is a downlink transport channel associated with the transmission of physical-layer generated Paging Indicators (PIs). System information broadcast on a cell may identify certain common channels to be employed in idle mode. One or more PCHs may be established in a cell and carried in a Secondary Common Control Physical Channel (SCCPCH) indicated to the UE in system information. Each PCH may be uniquely associated with a Paging Indicator Channel (PICH), which is a fixed rate physical channel used to carry PIs. The UE may be configured for DRx in a low-power or idle mode to reduce power consumption. Power consumption can affect the maximum operational time of the UE, and can also significantly limit the data bandwidth of the UE.

Figure 7:
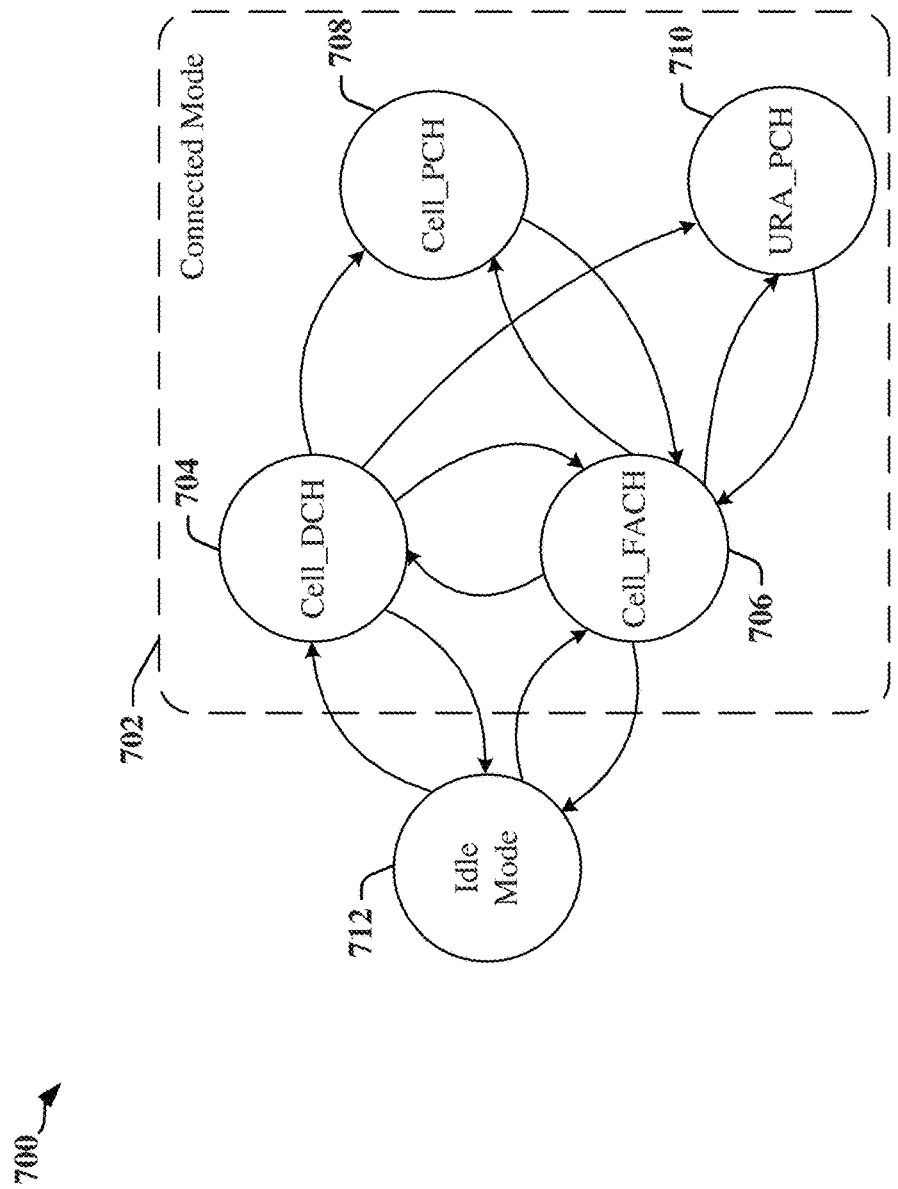
FIG. 7 is a state diagram illustrating certain active and sleep states for user equipment in accordance with some aspects of the disclosure.

FIG. 7 is a state diagram 700 illustrating certain RRC states and operational modes of the UE 304 of FIG. 3, for example. Two basic operational modes of the UE 304 are connected mode 702 and idle mode 712. The connected mode 702 can be further divided into a number of service states 704, 706, 708, 710, which define the kind of physical channels available for the UE 304 to use. FIG. 7 shows the main RRC service states 704, 706, 708 and/or 710 in the connected mode 702 and shows the transitions between service states of the connected mode 702 and the idle mode 712, as well as certain possible transitions between states 704, 706, 708 and/or 710 within the connected mode 702. In the idle mode 712, the UE 304 is able to receive system information and cell broadcast (CB) messages. The UE 304 stays in the idle mode 712 until it transmits a request to establish an RRC connection. The UTRAN typically does not have or maintain information about individual idle-mode UEs and may only address, for example, all UEs in a cell or all UEs that are monitoring a paging occasion.

In the connected mode 702, the UE 304 may be using a dedicated channel (DCH) in a Cell_DCH state 704, a forward access channel in a Cell_FACH state 706, a PCH in a Cell PCH_state 708, or a PCH to read UTRAN registration area (URA) in a URA_PCH state 710. In the Cell_DCH state 704, a dedicated physical channel is allocated to the UE 304, and the UE 304 is known by its serving base station on a cell or active set level. In the Cell_FACH state 706, no dedicated physical channel is allocated for the UE 304, but random access channels (RACHs) and forward access channels (FACHs) are instead used for transmitting both signaling messages and small amounts of user-plane data. The power consumption of the UE 304 is typically less in the Cell_FACH state 706 than that of the Cell_DCH state 704.

A UE 304 operating in a radio access network configured for DRx may be adapted to power off its radio receiver for a predefined interval of time (the DRx interval) while in idle mode 712. When DRx is used, the UE 304 may monitor a single PI in one Paging Occasion per DRx cycle, where the DRx cycle includes the DRx interval and a period of time during which the UE 304 powers-up its receiver to receive a page. In one example, a Paging Occasion may occur when the network transmits a list of UEs that have pending packets or calls. The DRx interval and the time between consecutive pages (the paging interval) can be periodic, aperiodic and/or intermittent. The DRx interval and/or the paging interval may be predefined, or may be determined by the UE 304 or the network based on network conditions, system configuration and other such factors. The DRx interval and/or the paging interval may be communicated in system information transmitted on the network.

The DRx cycle may be defined by the network. In some instances, a UE 304 may elect to ignore a page, in order to further reduce its power consumption. In some implementations, the UE 304 may be configured to negotiate its DRx cycle timing, whereby the network transmits pages referencing the UE 304 in accordance with the negotiated schedule. A UE 304 in idle mode 712 is generally expected to wake up before a page arrives and synchronize with the network. If a packet associated with the UE 304 is ready for transmission, the UE 304 may transmit a Receiver Ready frame in order to communicate the packet or call.

In one example of connected mode discontinuous reception (C-DRx), a DRx period of 320 ms may be configured to control when a UE wakes up to check for downlink data. After a DRx-based wake up, the UE may remain in active mode for up to 20 ms while scanning control channels for downlink assignments. If no downlink assignments are received in the 20 ms scanning period, the UE may return to sleep mode until awakened after the next DRx epoch. When a downlink assignment is received, the UE may start an inactivity timer that may count or track an active period of 200 ms. This inactivity timer is reset to the 200 ms period for every downlink assignment that is received. If no further downlink assignments are received during the 200 ms active period, then the UE may return to sleep mode.

Figure 8:
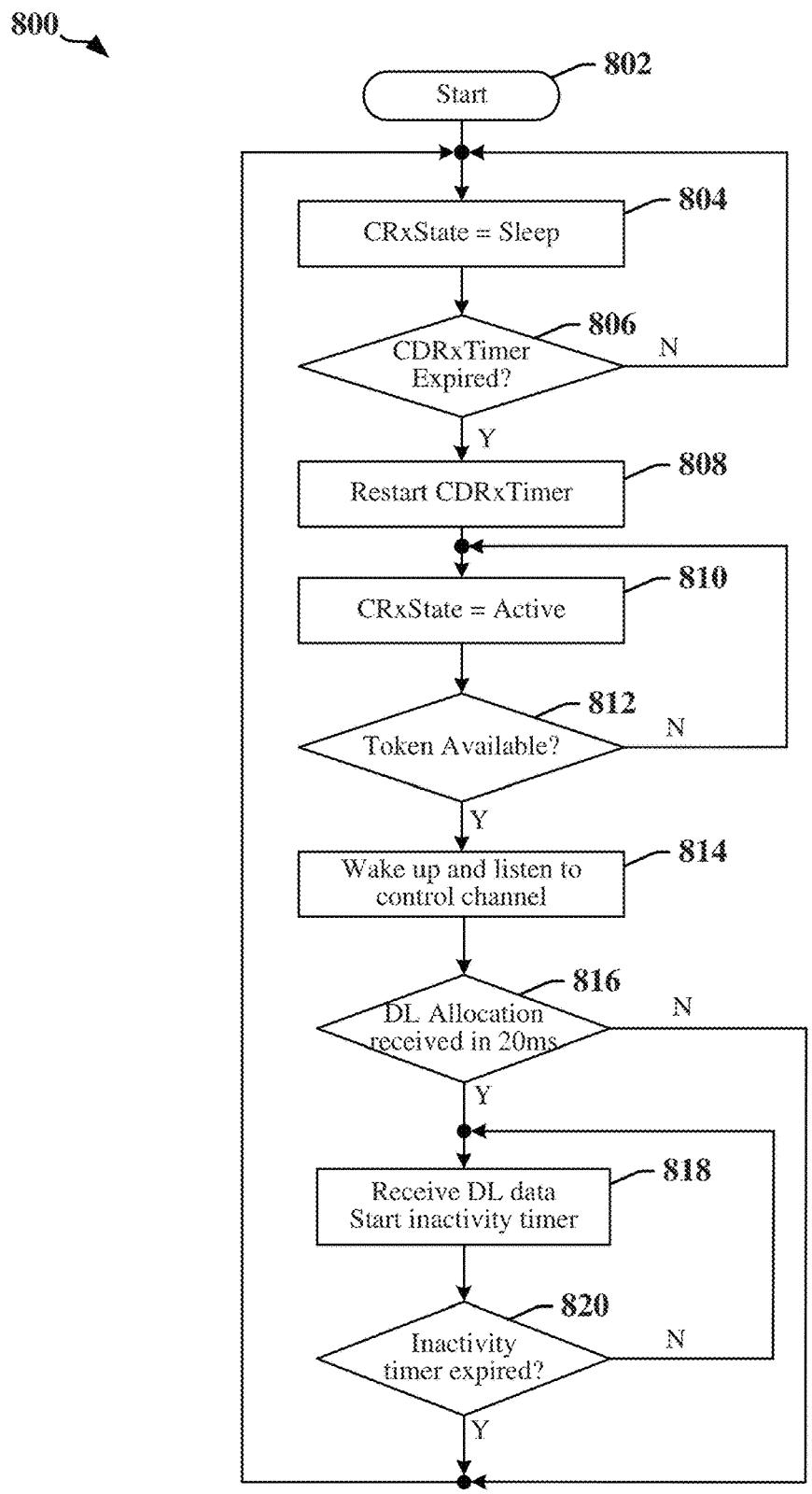
FIG. 8 is a flowchart illustrating a first example of a process implemented when C-DRx is combined with token bucket-based access in accordance with certain aspects disclosed herein.
Figure 9:
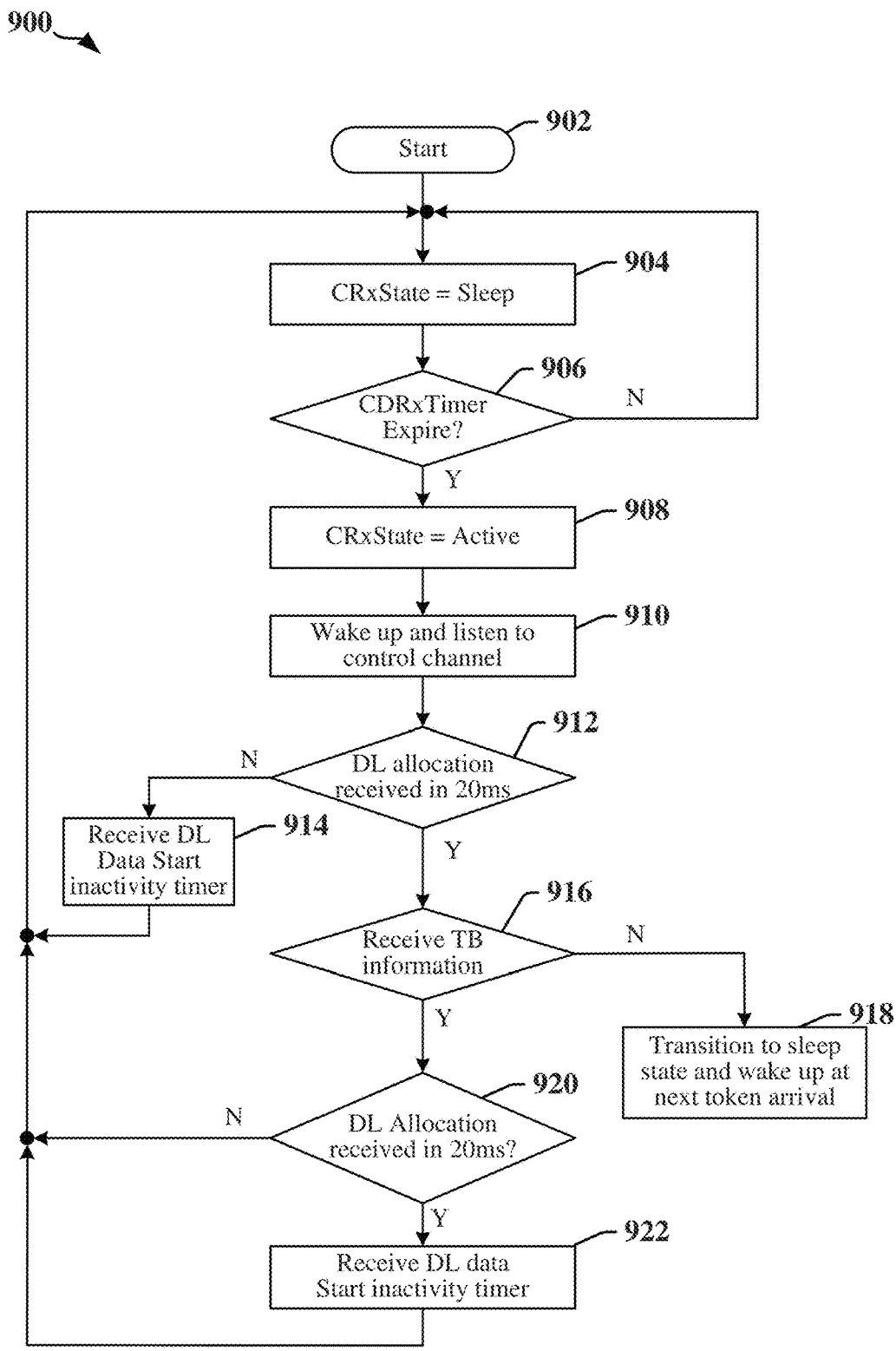
FIG. 9 is a flowchart illustrating a second example of a process implemented when C-DRx is combined with token bucket-based access in accordance with certain aspects disclosed herein.

FIGS. 8 and 9 illustrate processes that may be adopted when C-DRx is combined with token bucket-based access. The illustrated processes provide for power efficient sleep modes according to C-DRx configurations when a base station BS uses a token-based access protocol.

FIG. 8 is a flowchart 800 illustrating a first example of a process implemented when C-DRx is combined with token bucket-based access. The process may commence at block 802 when the UE completes an active period. At block 804, the UE may enter a C-DRx sleep state. The UE may remain in the C-DRx sleep state during a DRx period. In one example, the DRx period is 320 ms. The UE may use a C-DRx timer to determine when the DRx period has expired. For example, at block 806, the UE may continuously check the C-DRx timer to determine if the DRx period has expired, and the UE may cycle between blocks 804 and 806 for the duration of the DRx period. In another example, expiration of the timer may trigger an interrupt or event that alerts a processor of the UE in block 806 that the DRx period has expired. Having determined that the DRx period has expired the UE may restart the C-DRx timer at block 808.

At block 810, the UE may enter a CRx active state. The UE may then determine whether a token is available, indicating that control may be transmitted at a token arrival time. The UE may wait at block 812 for the token arrival time. If a token is available, the UE may wake up at block 814. The UE may power up an RF transceiver during wake up in order to receive a control channel from the network at block 818. In one example, the UE may wait at block 816 for a control channel indication for up to 20 ms when a token is available and the wake up occurs after a token arrival time and before a maximum time (T), which may be calculated as the sum of the time allocated for a token to be sent and the transmission time (B) for a number of subframes corresponding to the max token bucket size. If the wake up occurs after T+B, the UE may wait for the next token arrival time. In one example, the UE may wait for a control channel indication for up to 20 ms.

At block 816, the UE may wait for a downlink allocation. In one example, the UE waits for the downlink allocation when a token is available and the UE is in a C-DRx active state. If no downlink activity occurs at block 816, the UE may proceed to enter the sleep state at block 804. If the downlink allocation is received at block 816, the UE may receive downlink data and initiate an inactivity timer at block 818. The UE may continue to receive downlink data, restarting the inactivity timer, until the inactivity timer expires at block 820.

According to certain aspects, the UE may wake up and power up its RF transceiver at or near a token arrival time whenever a token is available for uplink traffic. The base station may track C-DRx cycles for each UE. In some instances, the UE sends downlink assignments at epochs when the UE has awakened in accordance with DRx timing.

In some instances, the UE may have inaccurate or incomplete token bucket information. According to certain aspects, the base station may provide updated token bucket information and other control information at times when the UE is expected to wake up in accordance with a known DRx schedule. In this regard, FIG. 9 is a flowchart 900 illustrating a second example of a process implemented when C-DRx is combined with token bucket-based access. The process may commence 902 when the UE completes an active period. At block 904, the UE may enter a C-DRx sleep state. The UE may remain in the C-DRx sleep state for a DRx period. In one example, the DRx period is 320 ms. The UE may use a C-DRx timer to determine when the DRx period has expired. For example, at block 906, the UE may continuously check the C-DRx timer to determine if the DRx period has expired, and the UE may cycle between blocks 904 and 906 for the duration of the DRx period. In another example, expiration of the timer may trigger an interrupt or event that alerts a processor of the UE in block 906 that the DRx period has expired. Having determined that the DRx period has expired the UE enters the C-DRx active state at block 908, and wakes up at block 910. In waking up, the UE may power up its RF transceiver in order to listen to the control channel.

At block 912, the UE may determine whether a downlink allocation has been provided. If the base station has started transmission of a subframe sequence, the UE may scan the control channel to check for downlink allocations. If downlink allocations are available, then the UE may remain awake to receive downlink data at block 914. The base station may send a PDCCH frame when the base station has not started transmission of a subframe sequence. The CCH frame may be aligned with the subframe boundaries, and may include token bucket information. At block 916, the UE may determine if token bucket information has been received. If no token bucket information has been received, the UE may transition to a sleep state and wake up at the token arrival time.

If it is determined at block 916 that token bucket information has been received, then the UE may wait at block 920 to receive a downlink allocation. The token bucket information may include new or updated information regarding token arrival times, the status and occupancy of the token bucket and other information.

If no downlink allocation is received at block 920, the UE may return to the sleep state at block 904. If a downlink allocation is received at block 920, the UE may receive downlink data at block 922 and return to the sleep state at block 904 after expiration of an inactivity timer.

Current token bucket state may be provided in a PDCCH transmission by the base station. The base station may send a PDCCH in a full sequence of subframes (see the complete access block 612 in FIG. 6), and/or in a short sequence of subframes associated with a fractional token (see the partial access block 608 in FIG. 6). In some instances, a PDCCH is transmitted only if a fractional token or more is available. In some implementations, a PDCCH may be sent at or near the DRx wake time of one or more UEs irrespective of the availability of a fractional token.

Figure 10:
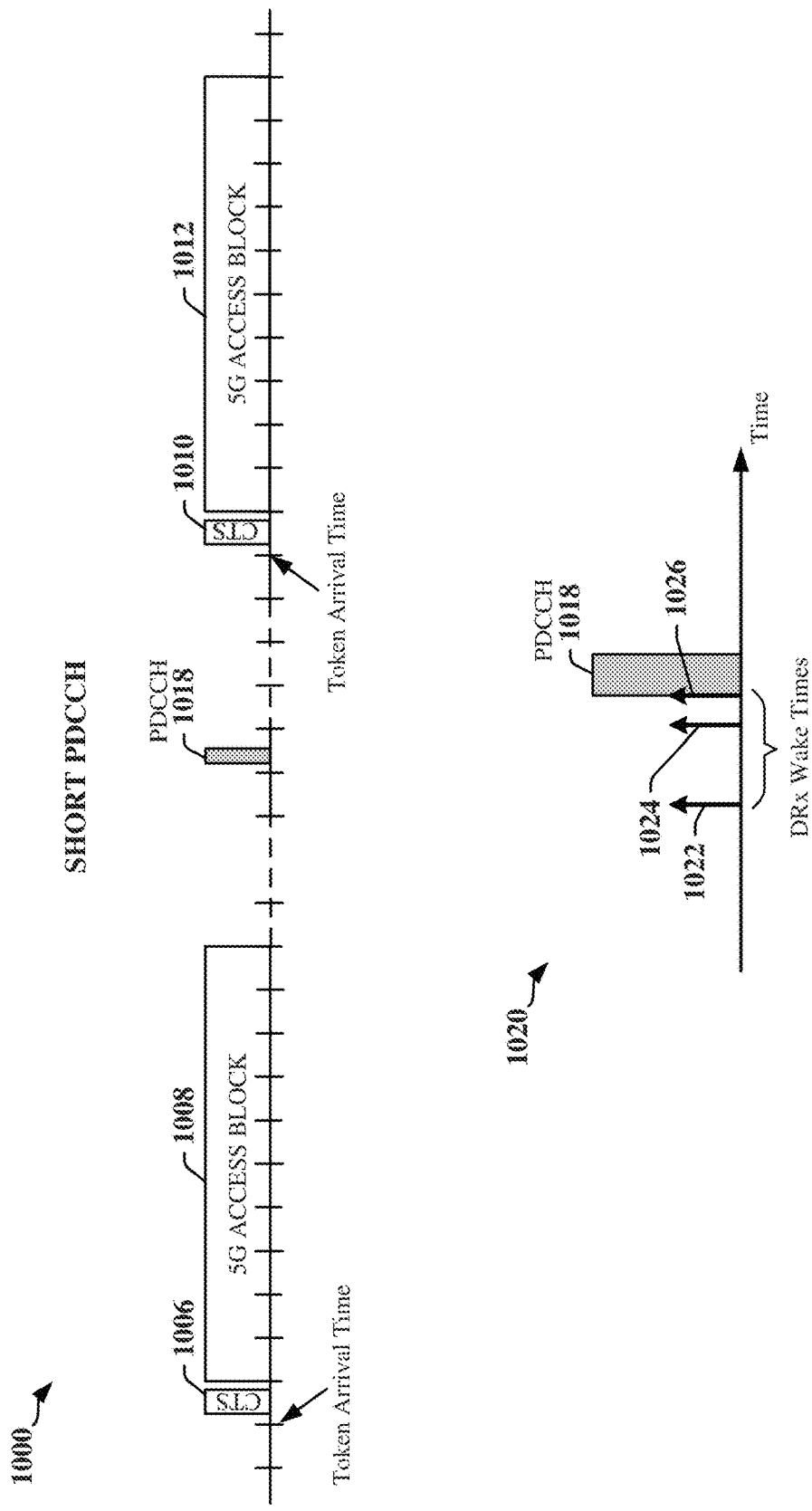
FIG. 10 illustrates an example of short control frame transmissions in accordance with certain aspects disclosed herein.

FIG. 10 illustrates an example of short PDCCH transmissions. In some implementations, a device may be permitted to transmit a short control frame over a limited period of time without having or using a token or fractional token. A device transmitting the short control frame may perform a CCA procedure or some other type of medium contention procedure prior to transmission of the short control frame. The duration of the short control frame transmission may be limited by protocol or access network specifications. In some instances, a base station that supports C-DRx combined with token bucket-based access may transmit PDCCH symbols using rules that apply to short control frame transmissions. In some instances, the short control frame may be transmitted without first performing a CCA procedure or some other type of medium contention procedure.

In the example illustrated by the first timing diagram 1000, the base station transmits two access blocks 1008, 1012 based on availability of two tokens (indicated by the CTS frames 1006, 1010). Between transmission of the two access blocks 1008, 1012, the base station may transmit PDCCH 1018 in accordance with rules that apply to short control frame transmissions. The base station may use the short control frame transmission rules when no token is available or when no data is available for transmission.

The second timing diagram 1020 illustrates a relationship between DRx timing and timing of the PDCCH 1018. In a first example, the base station transmits PDCCH 1018 based on the DRx wakeup time 1026 defined for a target UE. In this first example, the UE wakes up to listen for the control channel and receives the PDCCH 1018. In a second example, the PDCCH 1018 may be transmitted based on the DRx wakeup times 1022, 1024, and 1026 defined for multiple UEs. In this second example, the base station transmits the PDCCH to coincide with the wakeup time 1026 of a first UE, which occurs after the wakeup times 1022, 1024 of second and third UEs. The first UE wakes up to listen for the control channel and receives the PDCCH 1018. The second and third UEs wake up before the PDCCH 1018 is transmitted, and are waiting for control information when the PDCCH 1018 is transmitted. In this manner multiple UEs can be provided with control information using a single PDCCH transmitted in accordance with rules that apply to short control frame transmissions.

Examples of Processing Circuits and Methods

Figure 11:
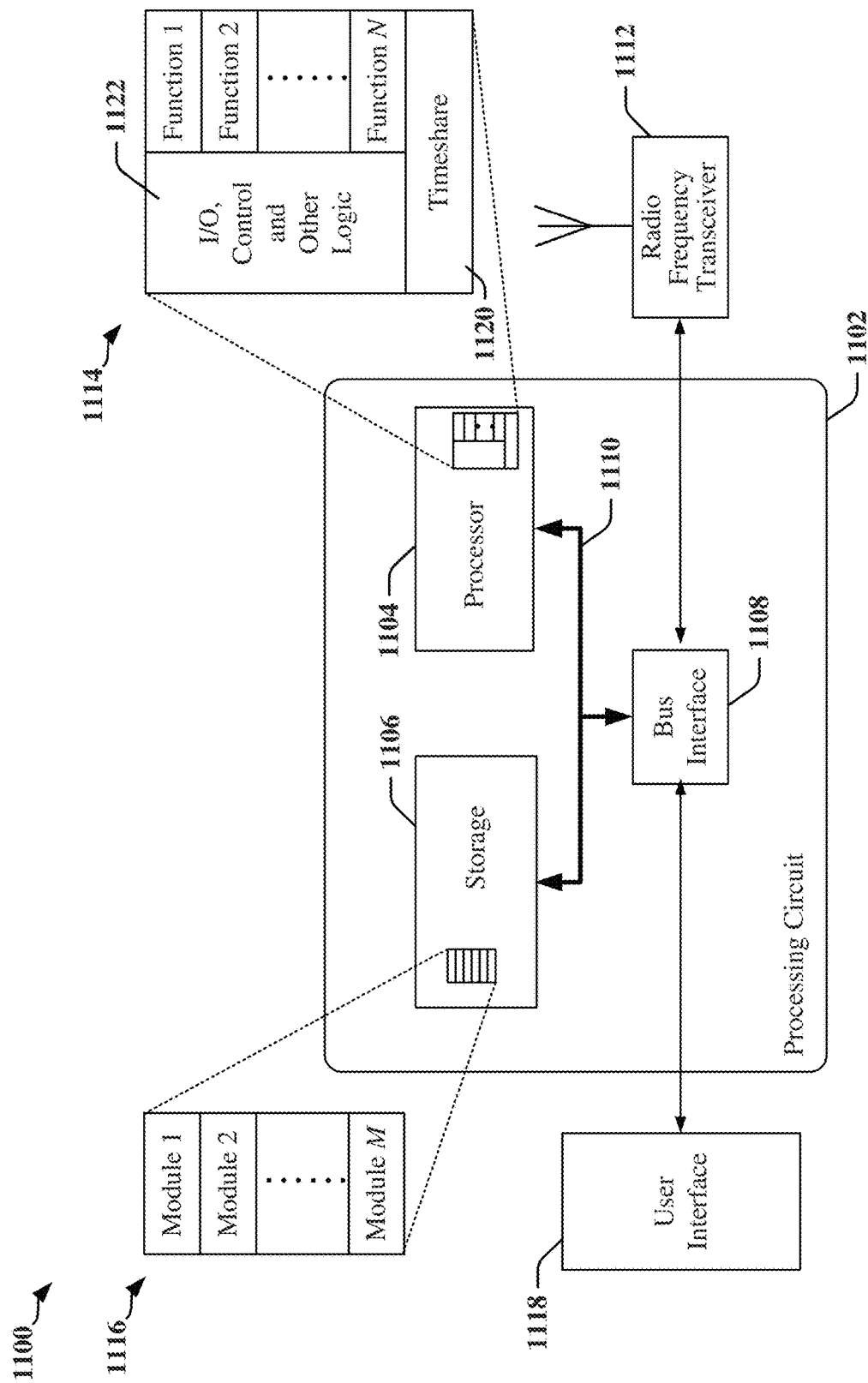
FIG. 11 is a block diagram illustrating an example of an apparatus employing a processing circuit that may be adapted in accordance with certain aspects disclosed herein.

FIG. 11 is a diagram illustrating an example of a hardware implementation for an apparatus 1100 employing a processing circuit 1102 that may be configured to perform one or more functions disclosed herein. In accordance with various aspects of the disclosure, an element, or any portion of an element, or any combination of elements as disclosed herein may be implemented using the processing circuit 1102. The processing circuit 1102 may include one or more processors 1104 that are controlled by some combination of hardware and software modules. Examples of processors 1104 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices, and may be referred to herein as computer-readable media and/or processor-readable media. The bus 1110 may also link various other circuits such as timing sources, timers, peripherals, voltage regulators, and power management circuits. A bus interface 1108 may provide an interface between the bus 1110 and one or more wireless transceivers 1112. A wireless transceiver 1112 may be provided for each radio access technology supported by the processing circuit. In some instances, multiple radio access technologies may share some or all of the circuitry or processing modules found in a wireless transceiver 1112. Each wireless transceiver 1112 provides a means for communicating with various other apparatus over a transmission medium. Depending upon the nature of the apparatus 1100, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement any one of the methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer-readable medium. The external computer-readable medium and/or storage 1106 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1106 may also include, by way of example, a carrier wave, a transmission line, and any other suitable medium for transmitting software and/or instructions that may be accessed and read by a computer. Computer-readable medium and/or the storage 1106 may reside in the processing circuit 1102, in the processor 1104, external to the processing circuit 1102, or be distributed across multiple entities including the processing circuit 1102. The computer-readable medium and/or storage 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as the wireless transceiver 1112, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to the wireless transceiver 1112, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the wireless transceiver 1112, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Scheduling Entity

Figure 12:
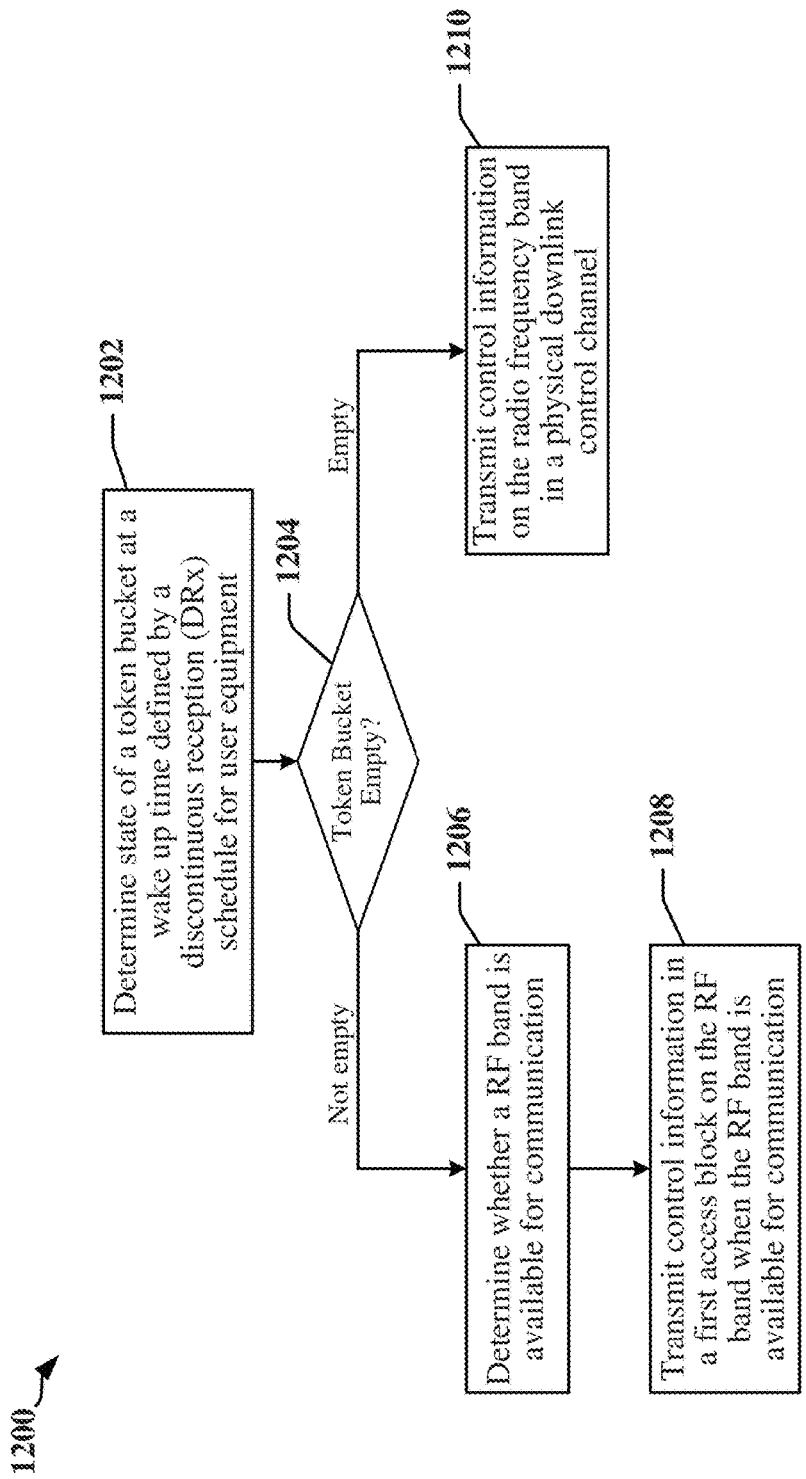
FIG. 12 is a flowchart illustrating a third example of a process implemented when C-DRx is combined with token bucket-based access in accordance with certain aspects disclosed herein.

FIG. 12 is a flowchart 1200 of a method that may be performed at a base station or scheduling entity of a radio access network.

At block 1202, the base station may determine state of a token bucket at a wake-up time defined by a DRx schedule for one or more UEs. If at block 1204, the base station determines that the token bucket is empty, the method may be continued at block 1210. If at block 1204, the base station determines that the token bucket contains at least one token, the method may proceed to block 1206.

At block 1206, the base station may determine whether a radio frequency band is available for communication. In one example, the base station may reserve the RF band for communication of a first access block if the RF band is determined to be available. The RF band may be reserved by sending a first reservation signal. The first reservation signal may include a clear-to-send.

At block 1208, the base station may transmit control information in a first access block on the radio frequency band if the radio frequency band is available for communication. The first reservation signal may precede the first access block.

The base station may communicate on the RF band during the first access block after reserving the RF band. The base station may determine whether the token bucket contains a second token completion of the communication on the radio frequency band during the access block, and may send a second reservation signal if the token bucket contains a second token. The base station may determine whether a token bucket contains a fractional token after completion of the communication of the access block. The base station may communicate on the RF band during a shortened second access block after the first access block if the token bucket contains the fractional token, and transmit the control information in the second access block.

In one example, the base station may communicate on the RF band includes using a WLAN technology. The DRx schedule may be defined using 5th Generation Mobile Telecommunications technology.

Figure 13:
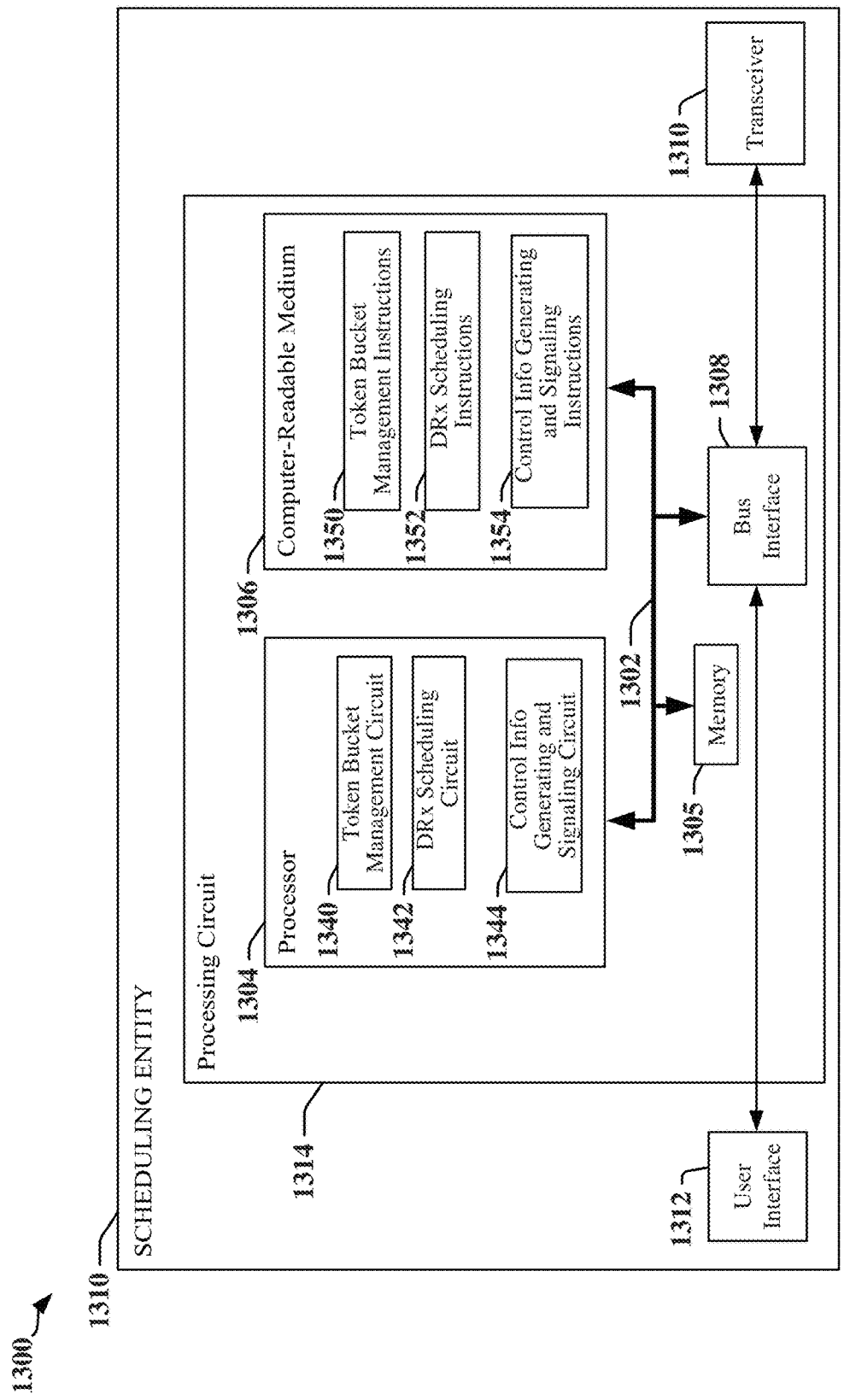
FIG. 13 is a conceptual diagram illustrating a hardware implementation for an exemplary scheduling entity adapted in accordance with certain aspects disclosed herein.

FIG. 13 is a conceptual diagram illustrating an example of a hardware implementation for an exemplary scheduling entity 1300 employing a processing circuit 1314. In accordance with various aspects of the disclosure, an element, or any portion of an element, or any combination of elements may be implemented with a processing circuit 1314 that includes one or more processors 1304. For example, the scheduling entity 1300 may be a user equipment (UE) as illustrated in any one or more of FIGS. 1, 2 and/or 3.

The scheduling entity 1300 may be implemented with a processing circuit 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1300 may be configured to perform any one or more of the functions described herein. That is, the processor 1304, as utilized in a scheduling entity 1300, may be used to implement any one or more of the processes and procedures described below and illustrated in FIG. 12.

In this example, the processing circuit 1314 may be implemented with a bus architecture, represented generally by the bus 1302. The bus 1302 may include any number of interconnecting buses and bridges depending on the specific application of the processing circuit 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a communication interface or means for communicating with various other apparatus over a transmission medium. Depending upon the nature of the apparatus, a user interface 1312 (e.g., keypad, display, speaker, microphone, joystick) may also be provided.

The processor 1304 is responsible for managing the bus 1302 and general processing, including the execution of software stored on the computer-readable medium 1306. The software, when executed by the processor 1304, causes the processing circuit 1314 to perform the various functions described below for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306. The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1306 may reside in the processing circuit 1314, external to the processing circuit 1314, or distributed across multiple entities including the processing circuit 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system. In various examples, the processing circuit 1314 may be configured to implement one or more of the functions described herein, including the process described in relation to FIG. 12.

In some aspects of the disclosure, the processing circuit 1314 may include a transceiver 1310 adapted to communicate on an RF band, a memory 1305, and a processor 1304 coupled to the memory 1305. The processor 1304 may be configured to determine state of a token bucket at a wake up time defined by a DRx schedule for user equipment, determine whether an RF band is available for communication when the token bucket contains a first token, transmit control information in a first access block on the RF band when the token bucket contains a first token and the RF band is available for communication, and transmit control information on the RF band in a short control frame when the token bucket contains no token. The short control frame may include a physical downlink control channel. The processing circuit 1314 may be configured to send a first reservation signal to reserve the RF band for communication of the first access block when the token bucket contains the first token, and transmit the first access block after the RF band is reserved. The first reservation signal may include a clear-to-send. The first reservation signal may precede the first access block. The processing circuit 1314 may determine whether the token bucket contains a second token after completion of the communication on the radio frequency band during the access block, and send a second reservation signal if the token bucket contains a token. The processing circuit 1314 may be configured to determine whether the token bucket contains a fractional token after completion of the communication of the access block, communicate in a shortened access block the RF band after the first access block when the token bucket contains the fractional token, and transmit the control information in the shortened access block. The processing circuit 1314 may be configured to communicate on the RF band using WLAN technology, and define the DRx schedule using 5G mobile telecommunications technology The processor 1304 is responsible for the execution of software stored on the computer-readable medium 1306. The software, when executed by the processor 1304, causes the processing circuit 1314 to perform the various functions described supra for any particular apparatus. The computer-readable medium 1306 may also be used for storing data that is manipulated by the processor 1304 when executing software, including data decoded from symbols transmitted over the radio access network. The processing circuit 1314 further includes at least one of the modules 1340, 1342, 1344, 1350, 1352 and 1354. The modules 1340, 1342, 1344, 1350, 1352 and 1354 may be software modules running in the processor 1304, resident/stored in the computer-readable medium 1306, one or more hardware modules coupled to the processor 1304, or some combination thereof. The modules 1340, 1342, 1344, 1350, 1352 and 1354 may include microcontroller instructions, state machine configuration parameters, or some combination thereof.

In one configuration, the scheduling entity 1300 includes a transceiver 1310 adapted to communicate on an RF band, a processor 1304 and a computer-readable medium 1306. The scheduling entity 1300 may include modules and/or circuits 1340, 1350 configured to determine state of a token bucket at wakeup time defined by a DRx schedule for one or more UEs. The scheduling entity 1300 may include modules and/or circuits 1342, 352 that is configured to determine whether a RF band is available for communication when the token bucket contains a first token. The scheduling entity 1300 may include modules and/or circuits 1344, 1354, 1310 that is configured to generate and transmit control information in a first access block on the radio frequency band or in a short control frame.

Scheduled Entity

Figure 14:
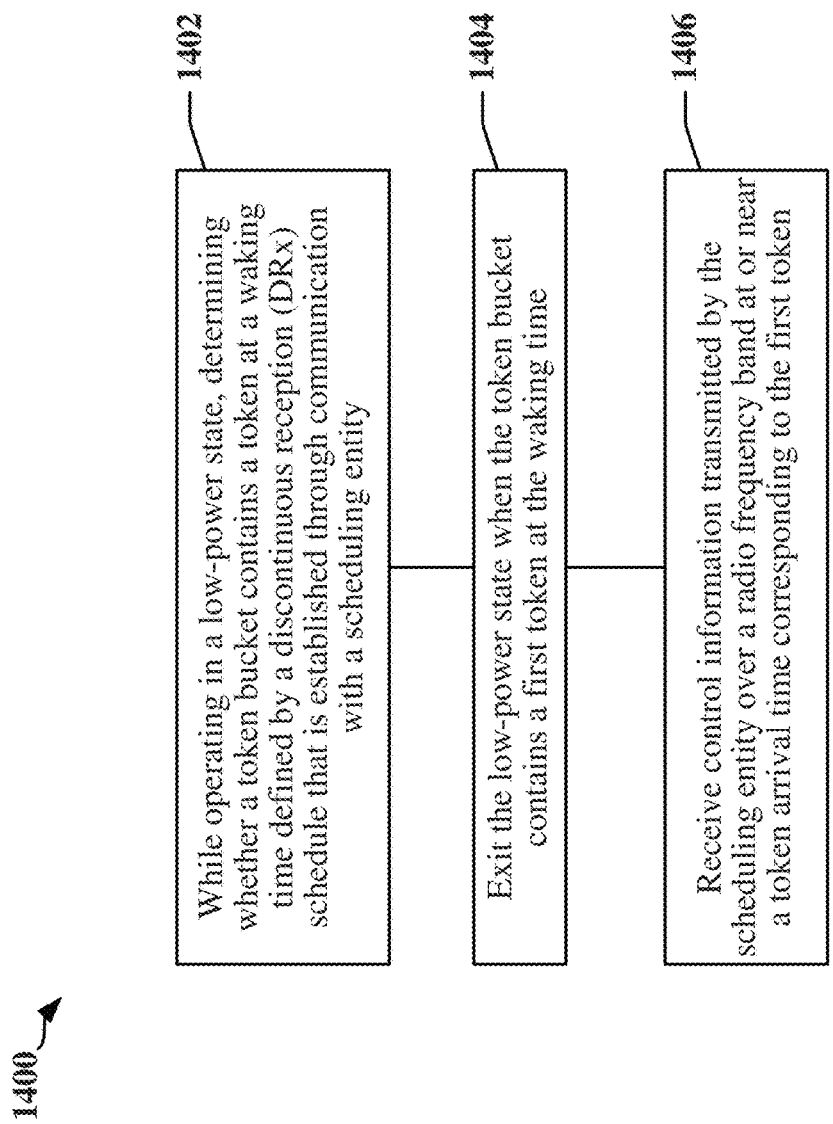
FIG. 14 is a conceptual diagram illustrating a hardware implementation for an exemplary scheduled entity adapted in accordance with certain aspects disclosed herein.

FIG. 14 is a flowchart 1400 illustrating certain aspects of a mobile communication device, such as a UE.

At block 1402, the UE may determine, while operating in a low-power state, whether a token bucket contains a token at a waking time defined by a DRx schedule that is established through communication with a scheduling entity.

At block 1404, the UE may exit the low-power state when the token bucket contains a first token at the waking time. Exiting the low-power state may include powering-up a radio frequency transceiver, and using the radio frequency transceiver to receive the control information.

At block 1406, the UE may receive control information transmitted by the scheduling entity over a radio frequency band at or near a token arrival time corresponding to the first token.

In one example, the control information may be received from a first access block transmitted on the radio frequency band.

In some examples, the content or state of the token bucket and/or token arrival times are updated through information received from the scheduling entity.

In some examples, the UE may determine whether the token bucket contains a second token after completion of the communication of the first access block, and may receive a second access block transmitted on the radio frequency band when the token bucket contains the second token. The UE may determine whether the token bucket contains a fractional token after completion of the communication of the first access block, and control information from a shortened access block transmitted on the radio frequency band when the token bucket contains the fractional token. The UE may receive the control information in a short control block transmitted on the radio frequency band. The short control frame may comprise a physical downlink control channel.

In one example, the control information is received using a WLAN technology. The DRx schedule may be defined using 5th Generation Mobile Telecommunications technology.

Figure 15:
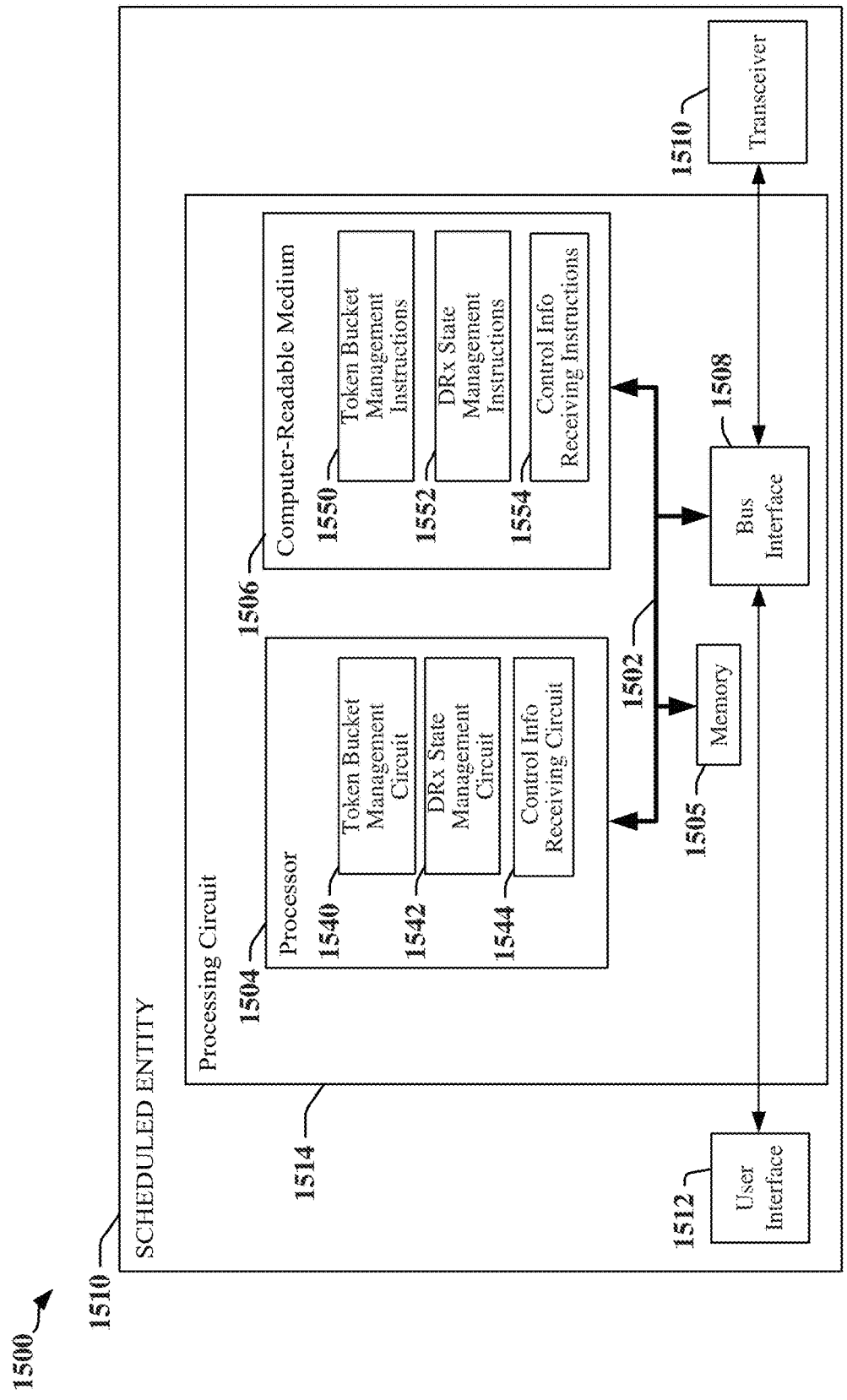
FIG. 15 is a diagram illustrating an example of a hardware implementation for a transmitting apparatus that supports a combination of C-DRx and token bucket-based access techniques in accordance with certain aspects disclosed herein.

FIG. 15 is a block diagram illustrating an example of a hardware implementation for a scheduled entity 1300 employing a processing circuit 1514. For example, the scheduled entity 1300 may be a user equipment (UE) as illustrated in any one or more of FIGS. 1, 2 and/or 3. In another example, the scheduling entity 1300 may be a base station as illustrated in any one or more of FIGS. 1, 2 and/or 3.

The processing circuit 1514 may be substantially the same as the processing circuit 1314 illustrated in FIG. 13, including a bus interface 1508, a bus 1502, memory 1505, a processor 1504, and a computer-readable medium 1506. Furthermore, the scheduled entity 1500 may include a user interface 1512 and a transceiver 1510 substantially similar to those described above in FIG. 15. That is, the processor 1504, as utilized in a scheduled entity 1500, may be used to implement any one or more of the processes described herein, including the process illustrated in FIG. 14.

In some aspects of the disclosure, the processing circuit 1514 may include a transceiver 1510 adapted to communicate on a radio frequency (RF) band, a memory 1505, and a processor 1504 coupled to the memory 1505. The processor may be configured to determine, while the apparatus is operating in a low-power state, whether a token bucket contains a token at a waking time defined by a discontinuous reception (DRx) schedule that is established through communication with a scheduling entity, exit the low-power state when the token bucket contains a first token at the waking time, and receive control information transmitted by the scheduling entity over a radio frequency band at or near a token arrival time corresponding to the first token. The control information may be received from a first access block transmitted on the radio frequency band. The processor 1504 may be configured to determine whether the token bucket contains a second token after completion of the communication of the first access block, and receive a second access block transmitted on the radio frequency band when the token bucket contains the second token. The processor 1504 may be configured to determine whether the token bucket contains a fractional token after completion of the communication of the first access block, and receive control information from a shortened access block transmitted on the radio frequency band when the token bucket contains a fractional token. The processor 1504 may be configured to receive the control information in a short control frame transmitted on the radio frequency band. The short control frame may include a physical downlink control channel. The content of the token bucket and token arrival times may be updated through information received from the scheduling entity. The transceiver 1510 may be adapted to communicate on the RF band using a WLAN technology, and the DRx schedule may be defined using 5G mobile telecommunications technology.

In one or more examples, the processing circuit 1514 includes at least one of the modules 1540, 1542, 1544, 1550, 1552 and 1554. The modules 1540, 1542, 1544, 1550, 1552 and 1554 may be software modules running in the processor 1504, resident/stored in the computer-readable medium 1506, one or more hardware modules coupled to the processor 1504, or some combination thereof. The modules 1540, 1542, 1544, 1550, 1552 and 1554 may include microcontroller instructions, state machine configuration parameters, or some combination thereof.

In one configuration, the transceiver 1510 is configured or adapted to communicate with a base station or scheduling entity on an RF band. The processing circuit 1514 may include modules and/or circuits 1540, 1542, 1550, 1552 configured to determine, while the scheduled entity 1500 is operating in a low-power state, whether a token bucket contains a token at a waking time defined by a DRx schedule that is established through communication with a scheduling entity. The processing circuit 1514 may include modules and/or circuits 1542, 1552 configured to cause the apparatus to exit the low-power state when the token bucket contains a first token at the waking time. The processing circuit 1514 may include modules and/or circuits 1544, 1554 that is configured to receive control information transmitted by the scheduling entity over a RF band at or near a token arrival time corresponding to the first token.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a user equipment having a radio frequency transceiver, comprising:
   while operating in a low-power state with the radio transceiver off, determining at the user equipment that a token bucket contains a first token at a waking time defined by a discontinuous reception (DRx) schedule that was established through communication with a scheduling entity;
   exiting the low-power state in response to a determination that the token bucket contains the first token at the waking time, wherein exiting the low-power state comprises powering up the radio transceiver; and
   receiving control information transmitted by the scheduling entity over a radio frequency band at or near a token arrival time corresponding to the first token.

2. The method of claim 1, wherein the control information is received from a first access block transmitted on the radio frequency band.

3. The method of claim 2, further comprising:
   determining that the token bucket contains a second token after completion of the communication of the first access block; and
   receiving a second access block transmitted on the radio frequency band in response to a determination that the token bucket contains the second token.

4. The method of claim 2, further comprising:
   determining that the token bucket contains a fractional token after completion of the communication of the first access block; and
   receiving control information from a shortened access block transmitted on the radio frequency band in response to a determination that the token bucket contains the fractional token.

5. The method of claim 2, further comprising:
   receiving the control information in a short control frame transmitted on the radio frequency band.

6. The method of claim 5, wherein the short control frame comprises a physical downlink control channel.

7. The method of claim 1, wherein
   the radio frequency transceiver is used to receive the control information.

8. The method of claim 1, wherein content of the token bucket and token arrival times are updated through information received from the scheduling entity.

9. The method of claim 1, wherein:
the control information is received using wireless local area network technology; and
the DRx schedule is defined using 5th Generation Mobile Telecommunications technology.

10. An apparatus for wireless communication comprising:
a transceiver adapted to communicate on a radio frequency (RF) band;
a memory; and
a processor coupled to the memory, wherein the processor is configured to:
determine, while the apparatus is operating in a low-power state with the transceiver off, that a token bucket contains a first token at a waking time defined by a discontinuous reception (DRx) schedule that was established through communication with a scheduling entity;
turn the transceiver on to exit the low-power state in response to a determination that the token bucket contains a first token at the waking time; and
receive control information transmitted by the scheduling entity over a radio frequency band at or near a token arrival time corresponding to the first token.

11. The apparatus of claim 10, wherein the control information is received from a first access block transmitted on the radio frequency band.

12. The apparatus of claim 11, wherein the processor is configured to:
determine that the token bucket contains a second token after completion of the communication of the first access block; and
receive a second access block transmitted on the radio frequency band in response to a determination that the token bucket contains the second token.

13. The apparatus of claim 11, wherein the processor is configured to:
determine that the token bucket contains a fractional token after completion of the communication of the first access block; and
receive control information from a shortened access block transmitted on the radio frequency band in response to a determination that the token bucket contains a fractional token.

14. The apparatus of claim 11, wherein the processor is configured to:
receive the control information in a short control frame transmitted on the radio frequency band, wherein the short frame does not require the use of a token.

15. The apparatus of claim 14, wherein the short control frame comprises a physical downlink control channel.

16. The apparatus of claim 10, wherein content of the token bucket and token arrival times are updated through information received from the scheduling entity.

17. The apparatus of claim 10, wherein:
the transceiver is adapted to communicate on the RF band using a wireless local area network (WLAN) technology; and
the DRx schedule is defined using 5th Generation Mobile Telecommunications technology.

18. A method of wireless communication, comprising:
determining that a token bucket contains or does not contain a first token at a wake up time defined by a discontinuous reception (DRx) schedule for user equipment;
in response to a determination that the token bucket contains a first token at the wake up time:
determining that a radio frequency band is available for communication;
reserving the radio frequency band for communication, wherein reserving the radio frequency band comprises sending a first reservation signal; and
transmitting control information in a first access block on the radio frequency band after reserving the radio frequency band; and
in response to a determination that the token bucket does not contain a first token at the wake up time, transmitting control information on the radio frequency band in a physical downlink control channel.

19. The method of claim 18, wherein the first reservation signal comprises a clear-to-send, and wherein the first reservation signal precedes the first access block.

20. The method of claim 18, further comprising:
determining that the token bucket contains a second token after completion of the communication on the radio frequency band during the access block; and
sending a second reservation signal if the token bucket contains the second token.

21. The method of claim 18, further comprising:
determining that the token bucket contains a fractional token after completion of the communication of the access block;
communicating on the radio frequency band during a shortened access block after the first access block in response to a determination that the token bucket contains the fractional token; and
transmitting the control information in the shortened access block.

22. The method of claim 18, wherein:
communicating on the radio frequency band includes using wireless local area network technology; and
the DRx schedule is defined using 5th Generation Mobile Telecommunications technology.

23. An apparatus for wireless communication comprising:
a transceiver adapted to communicate on a radio frequency (RF) band;
a memory; and
a processor coupled to the memory, wherein the processor is configured to:
determine that a token bucket contains or does not contain a token at a wake up time defined by a discontinuous reception (DRx) schedule for user equipment;
determine that a radio frequency band is available for communication in response to a determination that the token bucket contains a first token at the wake up time;
transmit control information in a first access block on the radio frequency band in response to determinations that the token bucket contains a first token and the radio frequency band is available for communication; and
transmit control information on the radio frequency band in a short control frame in response to a determination that the token bucket does not contain a token at the wake up time, wherein the short control frame does not require the use of a token.

24. The apparatus of claim 23, wherein the short control frame comprises a physical downlink control channel.

25. The apparatus of claim 23, wherein the processor is configured to:
  send a first reservation signal to reserve the radio frequency band for communication of the first access block in response to a determination that the token bucket contains the first token; and
  transmit the first access block after the radio frequency band is reserved.

26. The apparatus of claim 25, wherein the first reservation signal comprises a clear-to-send, and wherein the first reservation signal precedes the first access block.

27. The apparatus of claim 25, wherein the processor is configured to:
  determine that the token bucket contains a second token after completion of the communication on the radio frequency band during the access block; and
  send a second reservation signal if the token bucket contains a token.

28. The apparatus of claim 25, wherein the processor is configured to:
  determine that the token bucket contains a fractional token after completion of the communication of the access block;
  communicate in a shortened access block the radio frequency band after the first access block in response to a determination that the token bucket contains the fractional token; and
  transmit the control information in the shortened access block.

29. The apparatus of claim 23, wherein the processor is configured to:
  communicate on the RF band using wireless local area network (WLAN) technology; and define the DRx schedule using 5th Generation Mobile Telecommunications technology.

* * * * *